(12) United States Patent
Tan et al.

(10) Patent No.: US 11,080,143 B2
(45) Date of Patent: *Aug. 3, 2021

(54) SYSTEMS AND PROCESSES FOR DATA BACKUP AND RECOVERY

(71) Applicant: Dell Products L. P., Round Rock, TX (US)

(72) Inventors: Danilo O. Tan, Austin, TX (US); Abu Shaher Sanaullah, Austin, TX (US); Fernando L. Guerrero, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/508,661

(22) Filed: Jul. 11, 2019

(65) Prior Publication Data

US 2019/0332491 A1 Oct. 31, 2019

Related U.S. Application Data

(62) Division of application No. 15/248,998, filed on Aug. 26, 2016, now Pat. No. 10,409,689.

(51) Int. Cl.
*G06F 16/00* (2019.01)
*G06F 11/14* (2006.01)
(Continued)

(52) U.S. Cl.
CPC ...... *G06F 11/1451* (2013.01); *G06F 11/1464* (2013.01); *G06F 16/113* (2019.01); *G06F 16/184* (2019.01); *H04L 67/1095* (2013.01); *H04W 76/15* (2018.02); *G06F 2201/80* (2013.01)

(58) Field of Classification Search
CPC .. G06F 11/1451; G06F 16/113; G06F 16/184; G06F 11/1464; G06F 2201/80; H04W 76/15; H04L 67/1095
See application file for complete search history.

(56) References Cited

U.S. PATENT DOCUMENTS

| 8,805,790 B1 | 8/2014 | Chan et al. |
| 2007/0207729 A1 | 9/2007 | Chen et al. |
| 2008/0034004 A1 | 2/2008 | Cisler et al. |

OTHER PUBLICATIONS

Pham, Hung Q., U.S. Patent and Trademark Office, Final Office Action dated Mar. 28, 2019 for U.S. Appl. No. 15/248,998, 17 pages.

(Continued)

*Primary Examiner* — Hung Q Pham
(74) *Attorney, Agent, or Firm* — Larson Newman, LLP

(57) ABSTRACT

Systems and processes for backing up data files and recovering data files are described. A computing device connected to a network may backup data files for one or more additional computing devices connected to the network. In some cases, the computing devices connected to the network may be ranked according to a fitness of each respective computing device to backup data files. Additionally, data files of computing devices connected to a network may be prioritized to indicate a level of relative importance to backup each respective data file. Based on the rankings of the computing devices and the prioritization of the data files, particular data files may be associated with a corresponding computing device that is designated to store backup copies of the data files.

20 Claims, 7 Drawing Sheets

(51) Int. Cl.
*H04L 29/08* (2006.01)
*H04W 76/15* (2018.01)
*G06F 16/11* (2019.01)
*G06F 16/182* (2019.01)

(56) References Cited

OTHER PUBLICATIONS

Pham, Hung Q., U.S. Patent and Trademark Office, Non-Final Office Action dated Nov. 1, 2018 for U.S. Appl. No. 15/248,998, 16 pages.

SYSTEMS AND PROCESSES FOR DATA BACKUP AND RECOVERY

CROSS-REFERENCE TO RELATED APPLICATION

The present patent application is a continuation of U.S. patent application Ser. No. 15/248,998, filed on Aug. 26, 2016, entitled "Systems and Processes For Data Backup and Recovery" and is incorporated by reference herein in its entirety and for all purposes as if completely and fully set forth herein.

BACKGROUND

In a home networking environment, data is often backed up manually by an individual. Often, an individual may purchase an external storage device to store copies of data generated by other computing devices of the individual, such as a desktop computing device, a laptop computing device, a tablet computing device, a mobile phone, and so forth. The individual may identify data files on a computing device that is to be backed up, make a copy of the data files, and store copies of the data files in the external storage device. For example, an individual may copy photos, video data, audio data, word processing documents, spreadsheet documents, and the like, from a computing device and store this data on an external storage device. In situations where data files are lost or corrupted on the computing device, the individual may manually locate the copy of the lost or corrupted data files on the external storage device, and restore the lost or corrupted data files to the originating computing device.

SUMMARY

This Summary provides a simplified form of concepts that are further described below in the Detailed Description. This Summary is not intended to identify key or essential features and should therefore not be used for determining or limiting the scope of the claimed subject matter.

Techniques and systems to backup and recover data are described. A computing device connected to a network may backup data files for one or more additional computing devices connected to the network. In some cases, the computing devices connected to the network may be ranked according to a fitness of each respective computing device to backup data files. Additionally, data files of computing devices connected to a network may be ranked to indicate a level of relative importance to backup copies of each respective data file. Based on the rankings of the computing devices and the prioritization of the data files, particular data files may be associated with a corresponding computing device that is designated to store backup copies of the data files.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
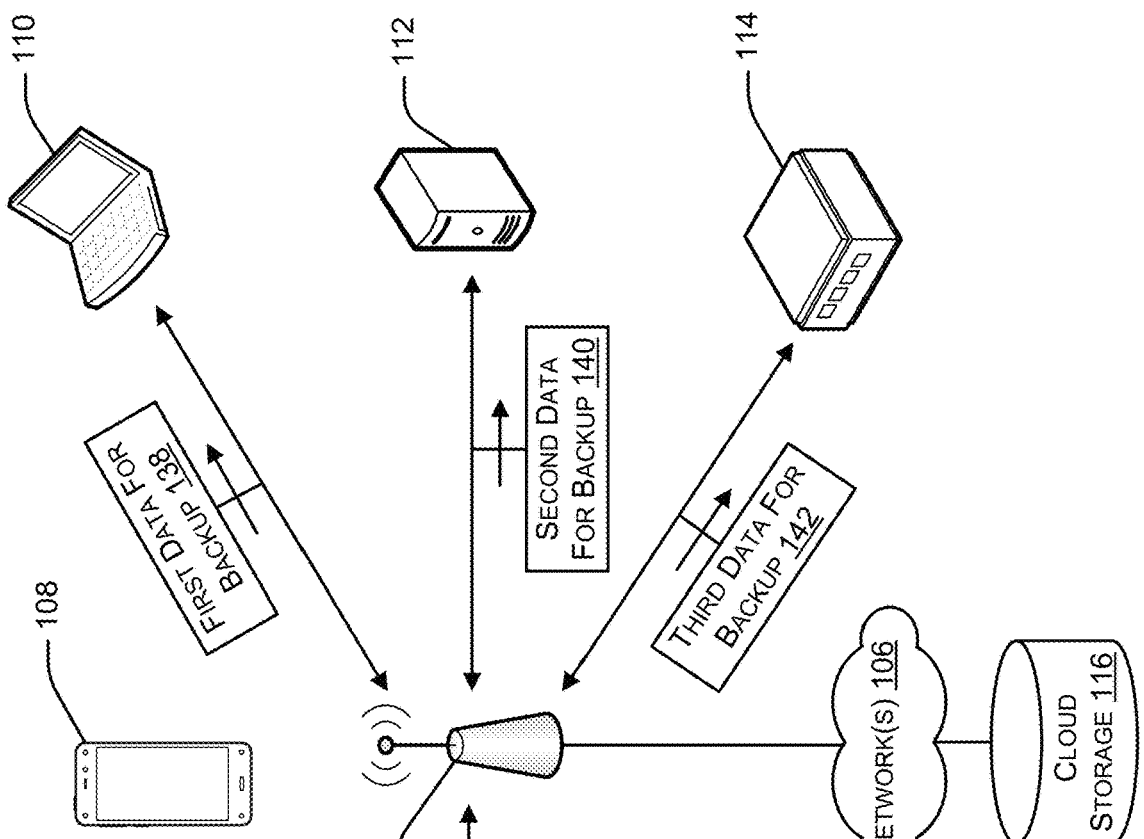
FIG. 1 is a schematic diagram illustrating an example environment to backup data and recover data files according to some embodiments.
Figure 1:
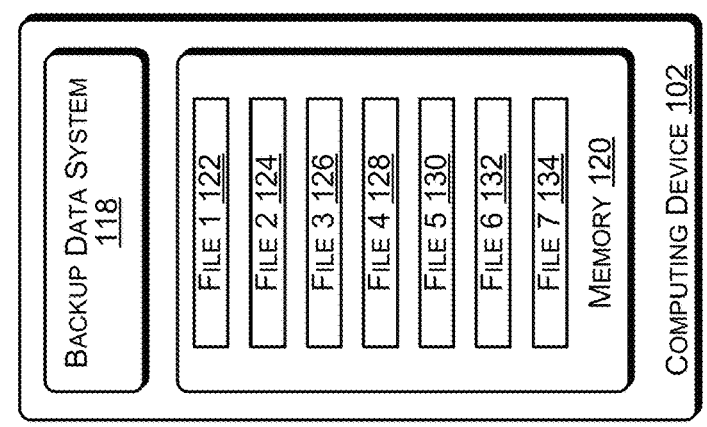

Described herein are systems and processes to backup and restore data. In particular, individuals or groups of individuals may utilize a number of computing devices in a particular environment, such as a living space or a workplace. The environment may include one or more wireless access points that the computing devices may utilize to access information sources, such as the Internet, a wireless wide area network, an enterprise network, a wired wide area network, and the like. One or more of the computing devices in the environment may be used to backup data from other computing devices in the environment. For example, data originally stored on a laptop computing device may be backed up on a desktop computing device. In another example, data originally stored on a mobile phone may be backed up on a desktop computing device or a laptop computing device. External storage devices in the environment may also be used to backup data from other computing devices in the environment.

A computing device may identify additional computing devices in the environment and identify one or more of the additional computing devices to store copies of files from the computing device. In some cases, the additional computing devices and the computing device may be connected to a local wireless network via a local wireless network access point. In this way, the computing device may communicate with the additional computing devices via the wireless access point. In some cases, communications exchanged via the local wireless network may utilize a communications standard, such as an Institute of Electrical and Electronics Engineers (IEEE) 802.11 communications standard. Additionally, the computing device may also exchange communications with the additional computing devices via other wireless networks utilizing a different communications standard, such as a Bluetooth communications standard.

The computing device may obtain information from the additional computing devices in the network to identify one or more additional computing devices on which to store copies of data files of the computing device. In particular, the computing device may analyze information obtained from the additional computing devices to rank the additional computing devices with respect to one another according to a number of criteria. The rank of each of the additional computing devices may indicate the fitness of the additional computing device to store backup data files for the computing device. For example, the rank of the additional computing devices may be based at least partly on storage capacity of the additional computing devices, a type of chassis of the additional computing devices, availability of the memory devices of the additional computing devices, memory device characteristics of the additional computing devices, or combinations thereof. In some cases, a weighting may be specified for each of the criteria used to determine the rank of a particular additional computing device. The ranking of the additional computing devices may indicate a level of reliability of the additional computing devices with respect to storing backup copies of data files. The ranking of the additional computing devices may also indicate a level of accessibility of backup copies of data files stored by the additional computing devices.

The computing device may also analyze features of data files stored in the memory of the computing device to prioritize the data files with regard to backing up the data files on one or more of the additional computing devices. In particular, the computing device may determine a rank of the data files with respect to one another based on one or more criteria. To illustrate, the computing device may determine a rank of data files stored in the memory of the computing device based at least partly on a storage location of the data files, an amount of memory space used to store the individual data files, a type of content of the data files, a frequency of use of the data files, user-specified priorities, or combinations thereof. By prioritizing the data files stored in the memory of the computing device, the computing device may identify the data files that are relatively more important for the individual and determine that these relatively important data files are backed up before other data files.

The computing device may determine data files to be backed up based on the ranking of the additional computing devices and the ranking of the data files to be backed up. For example, the computing device may associate additional computing devices having relatively higher ranking with data files having relatively higher rankings. In this way, the additional computing devices that are determined to have the most fitness for storing backup data may be used to store the data files that are determined to have the most importance to the individual. Additionally, the data files having certain characteristics may be backed up on an additional computing device that is suitable for those data files. To illustrate, data files that consume a particular amount of memory space may be stored on additional computing devices that have a sufficient amount of memory space available to store the data files.

The computing device may maintain a manifest indicating a storage location of data files that have been backed up. In addition, each additional computing device that is storing data files of the computing device may maintain a separate manifest of the data files that the particular additional computing device is storing. In this way, the data files stored on the computing device may be restored in case of corruption or loss of one or more of the data files. In situations where the computing device is seeking to restore a lost or corrupted data file, the computing device may utilize a local copy of the manifest to determine the additional computing device and the storage location on the additional computing device for the data file that is being restored. The computing device may then request the data file from the identified additional computing device. In other situations, a different computing device may seek to restore the data files of the computing device. For example, the computing device may be lost, stolen, or the memory of the computing device may be otherwise inaccessible. Thus, a different computing device may send requests to each of the additional computing devices that store backup files for the computing device.

The additional computing devices may access their locally stored manifests and provide the backed up data files to the different computing device. Furthermore, each computing device that is part of a backup storage system may include a system manifest that indicates each respective computing device and storage locations for each data file that is backed up. Accordingly, each computing device may determine a storage location for each data file that is backed up by the backup storage system during a data file recovery process.

In an illustrative implementation, a computing device may access a wireless local area network via a wireless access point located in a living space of a user of the computing device. The computing device may identify other computing devices that are also connected to the wireless local area network and determine computing devices that are candidates to backup data for the computing device. For example, a laptop computing device may access a local area wireless network via a wireless access point at the user's home and identify a desktop computing device, a mobile phone, and a network attached storage (NAS) device that are also connected to the local area wireless network via the wireless access point. The laptop computing device may identify computing devices that are connected to the wireless access point for a threshold amount of time to determine computing devices that may also be associated with the home environment of the user. In the current illustrative example, the computing device may determine that the desktop computing device and the NAS device are connected to the local area wireless network for a threshold amount of time and designate the desktop computing device and the NAS device as being part of the home environment of the user. The computing device may also determine that the mobile phone is not coupled to the local area wireless network for a threshold amount of time and designate the mobile phone as being a computing device that is a visitor to the home environment of the user.

After determining computing devices that are part of the home environment of the user, the computing device may analyze features of the other computing devices that are part of the home environment of the user and prioritize the other computing devices for the purpose of backing up data files of the computing device. In particular, the laptop computing device may determine a first fitness score for the NAS device that has a greater value than a second fitness score for the desktop computing device. The laptop computing device may also identify data files stored in the memory of the laptop computing device to be backed up on the NAS device and/or the desktop computing device. For example, the laptop computing device may identify photos and videos to be backed up by the NAS device and the desktop computing device. In another example, the laptop computing device may identify data files stored in association with a particular folder, such as a "My Documents" folder, that are to be backed up by the NAS device and/or the desktop computing device. The laptop computing device may prioritize the data files to be backed up and store the higher priority data files on the NAS device having the fitness score with the greater value. When the available memory space of the NAS runs out, the laptop computing device may backup the remaining data files on the desktop computing device.

In cases where a data file of the laptop computing device becomes lost or corrupt, the laptop computing device may access a manifest stored by the laptop computing device to determine whether a backup copy of the data file is stored by the NAS device or the desktop computing device. The laptop computing device may then request the data file from the NAS device or the desktop computing device. In other situations, the memory of the laptop computing device may become inaccessible. For example, the laptop computing device may have been lost, stolen, or damaged such that the data files stored on the memory of the laptop computing device are no longer accessible. In these situations, a different computing device, such as a new laptop computing device, may send requests to the desktop computing device and the NAS device and retrieve the data files of the original laptop computing device that are backed up on the desktop computing device and the NAS device.

By identifying additional computing devices for backing up data files that are often accessible to a user of a computing device, the processes to backup data and recover data may be simplified. In particular, the backing up of data files may be automated and the copies of the data files may be stored on multiple devices based on the suitability of the computing devices for storing backup data and based on the importance of the data files to a user. In this way, the data files that are most important to the user are backed up on the devices that are most suitable for backing up data files and the involvement of the user in deciding when and where to back up data files may be minimized or eliminated in some situations. Additionally, a user does not have to purchase additional storage devices to backup data files, but may utilize computing devices that are already included in a home environment of the user.

FIG. 1 is a schematic diagram of an example environment 100 to backup data files and recover data files according to some embodiments. In particular, the environment 100 includes a computing device 102 and a wireless access point 104. The computing device 102 may connect to a local area wireless network via the wireless access point 104. The wireless access point 104 may connect with one or more additional networks 106. In some cases, the wireless access point 104 may enable computing devices to access the Internet. The wireless access point 104 may also enable computing device to access one or more enterprise networks. In addition, the wireless access point 104 may manage communications according to a communications standard, such as an IEEE 802.11 standard.

The environment 100 also includes a number of additional computing devices, such as a mobile phone 108, a laptop computing device 110, a desktop computing device 112, and an external storage device 114. In some implementations, the external storage device 114 may include a network access storage (NAS) device. The additional computing devices 110, 112, 114 may also establish a connection with the wireless access point 104. The computing device 102 and the additional computing devices 110, 112, 114 may exchange communications via the wireless access point. In some cases, the mobile phone 108 and the computing device 102 may exchange communications without using the wireless access point 104. For example, the computing device 102 and the mobile phone 108 may exchange communications using a different communications standard from the communications standard of the wireless access point 104. To illustrate, the computing device 102 and the mobile phone 108 may exchange communications using a Bluetooth communications standard. The computing device 102 may also exchange communications with a cloud storage service 116 via the networks 106.

The computing device 102 includes a backup data system 118 and memory 120. In some cases, the backup data system 118 may include computer-readable instructions that are stored by the memory 120. The backup data system 118 may also include hardware components, firmware components, or both to backup and restore data files of the computing device 102. In some cases, one or more of the additional computing devices 108, 110, 112, 114 may also include a backup data system that corresponds with the backup data system 118. The cloud storage service 116 may also be associated with a backup data system. The backup data systems of the additional computing devices 108, 110, 112, 114 and/or the cloud storage service 116 may include a common set of software components, hardware components, firmware components, or combinations thereof, that enable the exchange of information related to the backup and recovering of data files between the computing device 102, the additional computing devices 108, 110, 112, 114, and/or the cloud storage service 116. An additional computing device 108, 110, 112, 114, and/or the cloud storage service may not be candidates to backup data files of the computing device 102 in implementations where one of the additional computing devices 108, 110, 112, 114, and/or the cloud storage service 116 is not executing or otherwise associated with a backup data system.

The memory 120 may also store data files of the computing device 102. In the illustrative example of FIG. 1, the memory 120 stores a first data file 122, a second data file 124, a third data file 126, a fourth data file 128, a fifth data file 130, a sixth data file 132, and a seventh data file 134. The backup data system 118 may analyze features of the additional computing devices 108, 110, 112, 114 and the features of the cloud storage service 116 to determine a fitness of each of the computing devices 108, 110, 112, 114 and the cloud storage service 116 to backup data files stored by the memory 120. Additionally, the backup data system 118 may analyze features of the data files 122, 124, 126, 128, 130, 132, 134 to prioritize the backing up of the data files 122, 124, 126, 128, 130, 132, 134.

In particular implementations, the backup data system 118 may obtain information from the additional computing devices 108, 110, 112, 114 and the cloud storage service 116 indicating a storage capacity of the additional computing devices 108, 110, 112, 114 and the cloud storage service 116. The storage capacity may indicate an amount of available memory space to store data for a particular additional computing device. The storage capacity may be less than the total amount of memory space available to store data on a computing device. For example, the storage capacity may indicate a portion of the amount of memory space available to store data on a computing device. In some instances, the backup data system 118 may set a threshold amount of storage space to be used for data backup on a particular computing device.

The backup data system 118 of the computing device 102 may also obtain information indicating an amount of time that the additional computing devices are located in the environment 100. In some cases, the backup data system 118 may obtain information indicating an amount of time that an additional computing device 108, 110, 112, 114 is connected to a local area wireless network via the wireless access point 104. In other cases, the backup data system 118 may obtain information indicating an amount of time that the additional computing is located at location coordinates associated with the environment 100. The location coordinates may include global positioning system (GPS) coordinates of the environment 100, latitude and longitude coordinates of the environment 100, or both.

In addition, the backup data system 118 of the computing device 102 may obtain information from the additional computing devices 108, 110, 112, 114 indicating other features of the additional computing devices. In particular implementations, the backup data system 118 may obtain information indicating a type of chassis of the additional computing devices 108, 110, 112, 114. For example, the backup data system 118 may obtain information from the additional computing device 108 indicating that the chassis of the additional computing device 108 is handheld. In another example, the backup data system 118 may obtain information from the additional computing device 110 indicating that the chassis of the additional computing device 110 is laptop and the backup data system 118 may obtain information from the additional computing device 112 indicating that the chassis of the additional computing device 112 is desktop, tower, or mini-tower. In an additional example, the backup data system 118 may obtain information from the additional computing device 114 indicating that the chassis of the additional computing device 114 is storage or server.

The backup data system 118 of the computing device 102 may also obtain information indicating an availability of the additional computing devices 108, 110, 112, 114. For example, the backup data system 118 may obtain information indicating that one or more additional computing devices 108, 110, 112, and/or 114 may enter a low power mode. To illustrate, after a threshold amount of time of inactivity, one or more of the additional computing devices 108, 110, 112, and/or 114 may enter a low power mode that requires input to exit the low power mode. In some cases, the backup data system 118 may obtain information from one or more of the additional computing devices 108, 110, 112, 114 indicating that one or more of the additional computing devices 108, 110, 112, 114 powers off after a threshold amount of time of inactivity.

Further, when a candidate backup storage device is in a low power mode, the backup data system 118 may monitor one or more system properties, such as thermal measurements, battery level, and the like, to determine an amount of involvement the candidate backup storage device is to have in backing up and restoring data files. In particular, the backup data system 118 may determine whether or not a computing device 110, 112, 114 is associated with a state that would interfere with the backup and/or restoration of data files. For example, a computing device 110, 112, 114 that is in a low power mode due to a low battery level may have a lower priority for backing up data files due to the possibility that the candidate backup storage device may not have enough power to complete the process of backing up data files from the computing device 102.

The backup data system 118 may also obtain information from the additional computing devices 108, 110, 112, 114 indicating an age of the memory devices of the additional computing devices 108, 110, 112, 114. In some cases, the backup data system 118 may determine an age of a hard drive, a flash drive, or another data storage device of the additional computing devices 108, 110, 112, 114 based on a manufacturing date of the additional computing device 108, 110, 112, 114, a BIOS manufacturing date of the additional computing device 108, 110, 112, 114, an operating system installation date of the additional computing device 108, 110, 112, 114, or a combination thereof. Additionally, the backup data system 118 may obtain information indicating a type of memory device of the additional computing devices 108, 110, 112, 114, such as a spinning hard drive, a solid state drive, a flash driver, and the like. Further, the backup data system 118 may obtain information indicating network interfaces utilized by the additional computing devices 108, 110, 112, 114. In particular, the backup data system 118 may obtain information from the additional computing devices 108, 110, 112, 114 indicating that the additional computing devices 108, 110, 112, 114 communicate via wired local area networks, wireless local area networks, wide area wireless networks, or combinations thereof. In particular implementations, the backup data system 118 may obtain information from the additional computing devices 108, 110, 112, 114 to determine the write speed of memory devices of the additional computing devices 108, 110, 112, 114.

The backup data system 118 may also obtain information from the cloud storage service 116 regarding the storage of data to by the cloud storage service 116. In some cases, the backup data system 118 may obtain information indicating an amount of storage space available for an account of a user of the computing device 102 with the cloud storage service 116. The backup data system 118 may utilize credentials of a user of the computing device 102 to access an account of the user with the cloud storage service 116 and store copies of data files of the computing device 102 with the cloud storage service 116.

The backup data system 118 may analyze the information obtained from the additional computing devices 108, 110, 112, 114, and the cloud storage service 116 to determine a fitness score for each of the additional computing devices 108, 110, 112, 114, and the cloud storage service 116. The fitness score may indicate a fitness of the additional computing devices 108, 110, 112, 114, and the cloud storage service 116 to backup data files of the computing device 102. In some cases, the fitness score may be based on weightings associated with information obtained from the additional computing devices 108, 110, 112, 114, and the cloud storage service 116. The weightings may indicate an amount of relative importance of the features of the additional computing devices 108, 110, 112, 114, and the cloud storage service 116. For example, an amount of available storage space may be associated with a first weighting, an amount of time located in the environment 100 may be associated with a second weighting, and an accessibility of a computing device may be associated with a third weighting. In particular implementations, the weightings for the features of the additional computing devices 108, 110, 112, 114, and the cloud storage service 116 may be approximately the same, while in other situations, the weightings of the features may be different. In an illustrative example, an average amount of time a computing device 108, 110, 112, 114 is located in the environment 110 may have a weighting with a greater value than a value of the weighting of the amount of storage space available. In another illustrative example, the weighting of the amount of storage space available may have a greater value than a type of chassis of a computing device.

In some implementations, the backup data system 118 may determine values for the features of the additional computing devices 108, 110, 112, 114, and the cloud storage service 116 and determine the fitness score for a particular candidate backup storage device based at least partly on the values of the features and the weightings for the features. In an example, the backup data system 118 may determine a value of a first feature related to the amount of time spent in the environment 100 for the computing device 108 and a value of the first feature for the additional computing device 110. The backup data system 118 may also determine a value of a second feature related to the amount of available storage space for the additional computing device 108 and a value of the second features for the additional computing device 110. The backup data system 118 may utilize the value of the first feature for the additional computing device 108, the value of the first feature for the additional computing device 110, the weighting of the first features, the value of the second feature for the additional computing device 108, the value of the second feature for the additional computing device 110, and the weighting of the second feature to determine fitness scores for the additional computing device 108 and the additional computing device 110. In a particular example, the backup data system 118 may determine that a fitness score for the additional computing device 110 has a greater value than a fitness score of the computing device 108 because the additional computing device 110 is located in the environment 100 for a greater amount of time than the additional computing device 108 and because the additional computing device 110 has more available memory space to store copies of data files of the computing device 102 than the additional computing device 108. Continuing with this example, the backup data system 118 may determine that data files of the computing device 102 may be backed up on the additional computing device 110 before data files of the computing device 102 are backed up on the additional computing device 108 because the fitness score for the additional computing device 110 has a greater value than the fitness score for the additional computing device 108.

Additionally, the backup data system 118 may also prioritize the backing up of data files stored in the memory 120 based at least partly on features of the data files. For example, the backup data system 118 may rank data files stored in the memory 120 based at least partly on a storage location of the data files. To illustrate, the backup data system 118 may determine a rank of a data file based at least partly on the data file being stored in a particular folder, such as a My Documents folder or a My Photos folder. The backup data system 118 may also determine a rank of a data file based on an amount of memory space consumed by the data file (e.g., 500 KB, 1 MB, etc.) and a type of content associated with the data file (e.g., image content, video content, audio content, word processing document, portable document format (PDF) document, spreadsheet document, and the like). Further, the backup data system 118 may determine a rank of a data file based on a frequency of use of the data file, an age of the data file, editing performed with respect to the date file, user preferences, or combinations thereof. In an illustrative example, the backup data system 118 may rank the data files 122, 124, 126, 128, 130, 132, 134 and determine that the first data file 122, the third data file 126, and the sixth data file 132 are to be backed up before the other data files 124, 128, 130, and 134 because the first data file 122, the third data file 126, and the sixth data file 132 include video content that is stored in a My Videos folder.

The backup data system 118 may utilize the fitness scores for the candidate backup storage devices and the ranking of the data files stored in the memory 120 to determine the particular data files to be stored by corresponding candidate backup storage devices. For example, the backup data system 118 may determine that copies of data files stored by the memory 120 with relatively higher rankings are to be backed up before other data files having relatively lower rankings and are be stored by candidate backup storage devices having fitness scores with relatively greater values. The backup data system 118 may then produce copies of the data files to be backed up and send the copies of the data files to the corresponding backup storage devices. In the illustrative example of FIG. 1, the backup data system 118 may send data for backup 136 to one or more backup storage devices. The data for backup 136 may be sent to the backup storage devices via the wireless access point 104. In particular, a first portion of the data for backup 136 may be sent to the additional computing device 110 as first data for backup 138. The first data for backup 138 may include copies of one or more data files stored by the memory 120 that the backup data system 118 determined to be backed up by the additional computing device 110 based at least partly on a fitness score of the additional computing device 110 and on rankings of the one or more data files included in the first data for backup 138. A second portion of the data for backup 136 may be sent to the additional computing device 112 as second data for backup 140. The second data for backup 140 may include copies of one or more data files stored by the memory 120 that the backup data system 118 determined to be backed up by the additional computing device 112 based at least partly on a fitness score of the additional computing device 112 and on rankings of the one or more data files included in the second data for backup 140. Additionally, a third portion of the data for backup 136 may be sent to the additional computing device 114 as third data for backup 142. The third data for backup 142 may include copies of one or more of the data files stored by the memory 120 that the backup data system 118 determined to be backed up by the additional computing device 114 based at least partly on a fitness score of the additional computing device 114 and on rankings of the one or more data files included in the third data for backup 142.

In some implementations, at least a portion of the data for backup 136 may be sent to the cloud storage service 116. Also, data files that have been backed up on one or more of the additional computing devices 108, 110, 112, 114 may be moved to the cloud storage service 116 under certain conditions. For example, after a threshold period of time being stored on one of the additional computing devices 108, 110, 112, 114, one or more data files may be backed up by the cloud storage service 116. In another example, backup copies of data files that have not been accessed by the computing device 102 for a threshold period of time may be backed up by the cloud storage service 116.

Although the backup and recovery of data has been described with respect to the computing device 102 of FIG. 1, other computing device included in the environment 100 may also perform similar operations to backup and recover data files. For example, the additional computing devices 108, 110, 112, 114 may identify computing devices on which to store backup copies of data files. The additional computing devices 108, 110, 112, 114 may also prioritize the data files stored in the respective memories of the additional computing devices 108, 110, 112, 114 to be backed up.

Figure 2:
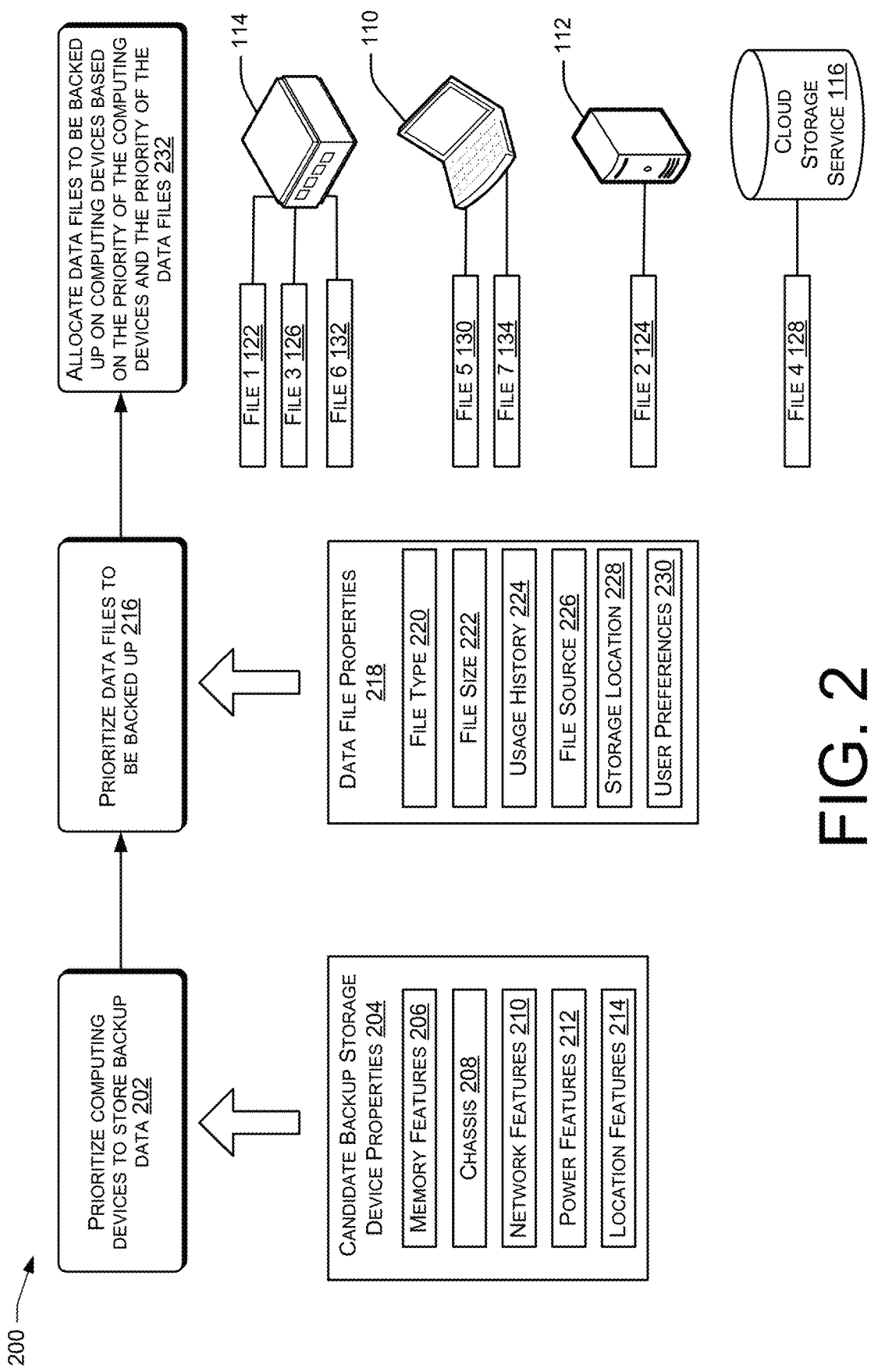
FIG. 2 is a diagram illustrating an example process to backup data according to some embodiments.

FIG. 2 is a diagram illustrating an example process 200 to backup data according to some embodiments. In some implementations, the operations of the process 200 may be performed by a backup data system, such as the backup data system 118 of FIG. 1. At 202, the process 200 includes prioritizing computing devices on which to store backup data. The prioritization of the computing devices may be based at least partly on an analysis of candidate backup storage device features 204. In the illustrative example of FIG. 2, the candidate backup storage devices include the laptop computing device 110, the desktop computing device 112, the NAS device 114, and the cloud storage service 116.

The candidate backup storage device features 204 may include memory features 206. The memory features 206 may include an amount of available memory space for storing data. The memory features 206 may also include a type of memory storage device included in a candidate backup storage device. For example, a candidate backup storage device may include a spinning hard drive. In another example, a candidate backup storage device may include a solid state drive. In an additional example, a candidate backup storage device may include a flash memory device. The memory features 206 may indicate a fitness of a candidate backup storage device for storing backup data files. To illustrate, a candidate backup storage device having a greater amount of available memory space may have a greater fitness for storing backup files than a candidate backup storage device having less available memory space. In another illustration, certain types of memory devices may be preferable for storing backup copies of data files. In some cases, a candidate backup storage device having a solid state drive may be designated as having a greater fitness for storing backup copies of data files than a spinning hard drive. Also, candidate backup storage devices having memory devices with faster write speeds may be designated as having a greater fitness for storing backup copies of data files than candidate backup storage devices having memory devices with slower write speeds.

The candidate backup storage features 204 may also include chassis features 208. The chassis features 208 may indicate a type of chassis of a candidate backup storage device. For example, a candidate backup storage device may have a laptop chassis. In another example, a candidate backup storage device may have a desktop chassis. In an additional example, a candidate backup storage device may have a tower chassis or a mini-tower chassis. In further examples, a candidate backup storage device may have a server chassis, a storage chassis, a portable chassis, or a handheld chassis. In some cases, particular chassis types may have a greater fitness for storing backup copies of data files than other types of chassis. To illustrate, a candidate backup storage device having a tower chassis or a storage chassis may have a greater fitness for storing backup copies of data files than a candidate backup storage device having a laptop chassis or a handheld chassis.

In addition, the candidate backup storage device features 204 may include network features 210. The network features 210 may indicate types of communication interfaces included in candidate backup storage devices. The types of communication interfaces included in a candidate backup storage device may indicate the types of networks that the candidate backup storage device may access. In some cases, the network features 210 may indicate that a candidate backup storage device may include a network interface for communicating via a wireless local area network. For example, the network features 210 may indicate that a candidate backup storage device may include a network interface for communicating via networks using an IEEE 802.11 communications standard. In another example, the network features 210 may indicate that a candidate backup storage device may include a network interface for communicating via networks using a Bluetooth communications standard. In an additional example, the network features 210 may indicate that a candidate backup storage device may include a network interface for communicating via wide area wireless networks. To illustrate, the network features 210 may indicate that a candidate backup storage device may include a network interface for communicating via a Global System for Mobile Communications (GSM) network, a code division multiple access (CDMA) network, a long-term evolution (LTE) network, an Enhanced Data rates for GSM Evolution (EDGE) network, a Universal Mobile Telecommunications System (UMTS) network, a High Speed Packet Access (HSPA) network, or combinations thereof. In still other examples, the network features 210 may indicate that a candidate backup storage device may include a network interface for communicating via wired networks, such as a wired local area network. In some implementations, one or more types of network features 210 may indicate a greater fitness for storing backup copies of data files than other network features 210. In an illustrative example, a candidate backup storage device having a network interface for communicating according to an IEEE 802.11 communications standard may have a greater fitness for storing backup copies of data files than a candidate backup storage device having a network interface for communicating according to a Bluetooth communications standard.

Further, the candidate backup storage device features 204 may include power features 212. The power features 212 may indicate that a candidate backup storage device enters a low power mode after being inactive for a threshold amount of time. In addition, the power features 212 may indicate that a candidate backup storage device powers off after being inactive for a threshold amount of time. The power features 212 may also indicate that a candidate backup storage device may receive input to cause the candidate backup storage device to exit a low power mode or to power on. In some cases, the power features 212 may indicate that a candidate backup storage device may receive one or more signals from another computing device to exit a low power mode or to power on. In other situations, the power features 212 may indicate that a candidate backup storage device may receive input from a user of the candidate backup storage device to exit a low power mode or to power on. In particular implementations, some of the power features 212 may indicate a greater fitness for storing backup copies of data files than other power features 212. In an illustrative example, a candidate backup storage device that may exit a low power mode by signals received from another computing device may have a greater fitness for storing backup copies of data file than a candidate backup storage device that exits a low power mode in response to input from a user, such as receiving an identifier and/or password of the user.

The candidate backup storage device features 204 may include location features 214. The location features 214 may indicate an amount of time that a candidate backup storage device is located in a particular location. The amount of time that a candidate backup storage device is located in a location may be based at least partly on an amount of time that the candidate backup storage device is connected to a wireless local area network via a wireless access point. In addition, the amount of time that a candidate backup storage device is located in a location may be based at least partly on an amount of time that the candidate backup storage device is located at or near particular geographic coordinates, such as GPS coordinates or latitude and longitude coordinates. An amount of time that a candidate backup storage device is located in one or more locations may indicate a fitness for storing backup copies of data files. For example, a candidate backup storage device may have a greater fitness for storing backup copies of data files of a computing device when the candidate backup storage device and the computing device are located in a same or similar location for a threshold amount of time. To illustrate, a candidate backup storage device that is located in a particular location for at least 50% of the time that the computing device is located in the particular location may have a greater fitness to store backup copies of data files of the computing device than a candidate backup storage device that is located in the particular location less than 50% of the time that the computing device is located in the particular location.

In particular implementations, a particular location may be designated as a trusted environment for a computing device and the fitness for storing backup copies of data files of the computing device may be based at least partly on an amount of time that the candidate backup storage device is located in the trusted environment. In an illustrative example, a home environment corresponding to a residence of a user may be designated for a computing device. The amount of time that a candidate backup storage device is located in the home environment of the user may be used to determine a fitness for storing backup copies of data files of the computing device.

To prioritize the computing devices that are candidate backup storage devices, the candidate backup storage device features 204 may each be associated with a weight that indicates a relative importance of a particular candidate backup storage device feature 204 in determining a fitness for storing backup copies of data files for a computing device. In some cases, at least two of the candidate backup storage device features 204 may have the same weighting. In addition, at least two of the candidate backup storage device features 204 may have a different weighting. In particular implementations, the weighting of the candidate backup storage device features 204 may be based at least partly on preferences of a user of the computing device associated with the data file being backed up. Also, the weighting of the candidate backup storage device features 204 may be designated by an entity associated with producing and/or distributing the backup data system 118 of FIG. 1. Further, the weighting of the candidate backup storage device features 204 may be determined over time based on input received from a user of the computing device associated with the data files being backed up. For example, a user of a computing device may provide explicit input to make copies of data files and store the copies of the data files in a particular candidate backup storage device. Continuing with this example, a system, such as the backup data system 118 may analyze the backup storage devices designated by the user and determine that features of those backup storage devices have a greater weighting than features of candidate backup storage devices that are not designated by the user to store copies of data files of the computing device.

The prioritizing of additional computing devices to store backup data for a computing device may be based on fitness scores calculated for each candidate backup storage device based at least partly on the candidate backup storage device features 204 and the weighting for the candidate backup storage device features 204 of each particular candidate backup storage device. The candidate backup storage devices may be ranked according to the fitness scores with the candidate backup storage device having the fitness score with the greatest value being designated as having the greatest amount of fitness to store backup copies of data files of a computing device.

At 216, the process 200 also includes prioritizing data files of a computing device to be backed up. Prioritizing the data files of the computing device to be backed up may be based at least partly on data file properties 218. The data file properties 218 may indicate or include information about certain characteristics of data files. For example, the data file properties 218 may include file type 220. The file type 220 may indicate content of a data file. The file type 220 may also indicate a type of formatting applied to the data of a data file. The file type 220 may indicate that a data file includes image content, such as photographs. The file type 220 may also indicate that a data file includes audio content, video content of both. In addition, the file type 220 may indicate that a data file includes a word processing document or a spreadsheet document. Further, the file type 220 may indicate that a data file includes a PDF document. In some cases, the file type 220 may indicate that a data file is an executable data file. In particular implementations, the file type 220 may be based at least partly on a file extension of a data file. Some of the file types 220 may have a higher priority than other file types 220. To illustrate, data files that include photos may have a higher priority than data files that are executables.

The data file properties 218 may also include file size 222. The file size 222 may indicate an amount of memory space consumed by a particular data file. In some examples, the file size 222 may be expressed as a number of bytes consumed by a data file. In particular implementations, data files having particular file sizes 222 may have a higher priority than other data files. In an illustrative example, data files having a file size that is greater than a threshold file size may have a higher priority than other data files. In another illustrative example, some data files may be too big for storing backup copies. Thus, data files having a file size that is less than a threshold file size may be relatively more important than other data files.

The data file properties 218 may also include usage history 224. The usage history 224 may indicate times that a data file was accessed and/or modified. For example, the usage history 224 may indicate a number of times that a data file was accessed over a specified period of time. In some cases, the usage history 224 of a data file may indicate a number of times that a data file was modified over a specified period of time. In some implementations, data files that are accessed and/or modified more frequently may have a higher priority than data files that are accessed less frequently. Additionally, data files that have not been accessed and/or modified for a threshold period of time may have a lower priority than data files that have been accessed more recently. In an illustrative example, a data file that was installed when a computing device was initially setup, but has not been accessed since, may have a lower priority than a data file that was accessed multiple times in the past three months.

In addition, the data file properties 218 may include file source 226. The file source 226 may indicate an application that produced the data file, such as a word processing application or a photo editing application. The application that produced the data file may be executing on a computing device from which the data files to be backed up are initially stored. The file source 226 may also indicate a location from which the data file originated. For example, the file source 226 may indicate a website from which the data file was obtained. In another example, the file source 226 may indicate a computing device from which the data file was obtained. In an illustrative example, the file source 226 may indicate that a data file was obtained from a mobile phone or a laptop computing device. In some cases, the data file properties 218 may indicate that the file source 226 includes a computing device that is associated with a particular individual. The file source 226 may be used to determine a priority for a data file. To illustrate, a data file that was obtained from a publicly accessible website may have a lower priority than a data file obtained from a mobile phone of an individual because a data file accessible from a public website may be easier to recover than a data file from a mobile phone of an individual.

Further, the data file properties may include storage location 228. The storage location 228 may indicate a path of a data file that may be used to access information associated with the data file. In some implementations, the path of the data file may indicate one or more directories of the data file, one or more folders of the data file, or both. In an illustrative example, a storage location 228 of a data file may include a My Documents folder that stores documents created by an individual or a My Videos Folder that stores videos created by an individual. In another illustrative example, the storage location 228 of a data file may include a Desktop folder that includes data files that are commonly used by a user of a computing device and/or data files that are relatively important for the user. In an additional illustrative example, the storage location 228 may include a Program Files folder that stores executable data files, libraries, scripts, and the like, for software being executed on a computing device. The storage location 228 may include a folder that is created by a user of a computing device. In other cases, the storage location may include a folder that is created by software executing on the computing device. In additional situations, the storage location may include a default folder that was produced during an initialization process for a computing device. The storage location 228 of a data file may be used to determine a priority for the data file. To illustrate, a data file being stored in a My Documents folder of a computing device may have a higher priority than a data file stored in a Program Files folder because a data file of the My Documents folder is more likely to have been created by a user and be harder to restore than a data file of a Program Files folder.

The data file properties 218 may also include user preferences 230. The user preferences 230 may indicate preferences for a user of a computing device in relation to data files that are important to the user. In some implementations, the user preferences 230 may indicate a degree of importance of properties of a data file that are important to the user. For example, a user may assign a weighting to one or more of the data file properties 218 or the user may modify a default weighting associated with one or more of the data file properties 218. In an illustrative example, the user preferences 230 may indicate one or more storage locations that include data files that are important to a user, such as a My Documents folder or a Desktop folder. In another illustrative example, the user preferences 230 may indicate one or more file sources that include data files that are important to a user, such as a mobile device of the user. In an additional illustrative example, the user preferences 230 may indicate one or more keywords included in a file name that indicate data files that are important to the user.

In an illustrative example, data files may be prioritized by determining a priority score for each of a number of data files stored by a computing device. The priority scores for each data file may be used to determine an order in which the respective data files are to be backed up. For example, a first set of data files having priority scores with greater values than a second set of data files may be backed up before the second set of data files. Also, priority scores for data files may be used to determine a backup storage device for the data files. To illustrate, data files having a particular range of priority scores and/or having priority scores above a threshold amount may be backed up on particular candidate backup storage devices. In some cases, the candidate backup storage devices may be designated to backup data files having certain priority scores.

The priority score for a data file may be determined based on analyzing one or more of the data file properties 218 for the data file. In some cases, a value may be assigned to one or more of the data file properties 218 for the data file. For example, a photo obtained from a mobile device of a user of the computing device may be assigned a value for the file type 220 being a photo, a value for the file size 222 being less than a maximum file size threshold, a value for the usage history 224 indicating that the file has been accessed 10 times in the past 3 months, a value for the file source 226 being the mobile device of the user, and a value for the storage location 228 being a My Photos folder of the computing device. A weight may also be assigned to one or more of the data file properties 218 for the data file. To illustrate, the file type 220 may be associated with a first weight, the file size 222 may be associated with a second weighting, the usage history 224 may be associated with a third weighting, the file source 226 may be associated with a fourth weighting, and the storage location 228 may be associated with a fourth weighting. In a particular example, the weighting of the file type 220 and the weighting of the storage location 228 may have greater values than the weighting of the file size 222, the weighting of the usage history 224, and the weighting of the file source 226.

At 232, the process 200 also includes allocating data files to be backed up on computing devices based at least partly on the priority associated with the computing devices and the priority of the data files being backed up. In some implementations, priority scores of data files and fitness scores of computing devices may be used to identify the particular data files to be backed up on corresponding computing devices. In some cases, the data files having priority scores with relatively greater values may be backed up on computing devices having relatively greater fitness scores. In a particular example, data files having priority scores greater than a threshold amount may be backed up on a computing device having a fitness score greater than a threshold amount. In this way, the computing devices having the greatest fitness for storing backup copies of data files as determined by a backup data system are associated with data files that are relatively more important for a user, as determined by the backup data system.

In the illustrative example of FIG. 2, a backup data system may determine fitness scores for the laptop computing device 110, the desktop computing device 112, the NAS device 114, and the cloud storage service 116. Based on the fitness scores, the backup data system may rank the computing devices in a particular order with the NAS device 114 having the highest rank, followed by the laptop computing device 110, the desktop computing device 112, and the cloud storage service 116. In this illustrative example, the backup data system may determine that the fitness scores for the candidate backup storage devices decreased from greatest to least starting with the NAS device 114 and ending with the cloud storage service 116.

Additionally, the backup data system may determine priority scores for the data files 122, 124, 126, 128, 130, 132, 134 and store backup copies of the respective data files at particular backup storage devices based on the priority scores for the data files 122, 124, 126, 128, 130, 132, 134 and the fitness scores of the candidate backup storage devices 110, 112, 114, 116. In the illustrative example of FIG. 2, a backup copy of the first data file 122 may be stored by the NAS device 114, a backup copy of the third data file 126 may be stored by the NAS device 114, and a backup copy of the sixth data file 132 may be stored by the NAS device 114. Also, a backup copy of the fifth data file 130 may be stored by the laptop computing device 110 and a backup copy of the seventh data file 134 may be stored by the laptop computing device 110. In addition, a backup copy of the second data file 124 may be stored by the desktop computing device 112 and a backup copy of the fourth data file 128 may be stored by the cloud storage service 116. In a particular implementation, the backup data system may determine that the first data file 122, the third data file 126, and the sixth data file 132 have priority scores that are greater than the priority scores of the data files 124, 128, 130, 132 and determine that backup copies of the data files 122, 126, 132 are to be stored on the candidate backup storage device having the highest fitness score, the NAS device 114. Further, the backup data system may determine that the fifth data file 130 and the seventh data file 134 have priority scores that are greater than the priority scores of the data files 124, 128 and determine that backup copies of the data files 130, 134 are to be stored on the candidate backup storage device having the second highest fitness score, the laptop computing device 110. The backup data system may also determine that the second data file 124 has a greater priority score than the fourth data file 128 and that a backup copy of the second data file 124 is to be stored by the candidate backup storage device having the third highest fitness score, the desktop computing device 112 and that a backup copy of the fourth data file 128 is to be stored by candidate backup storage device having the lowest fitness score, the cloud storage service 116.

Figure 3:
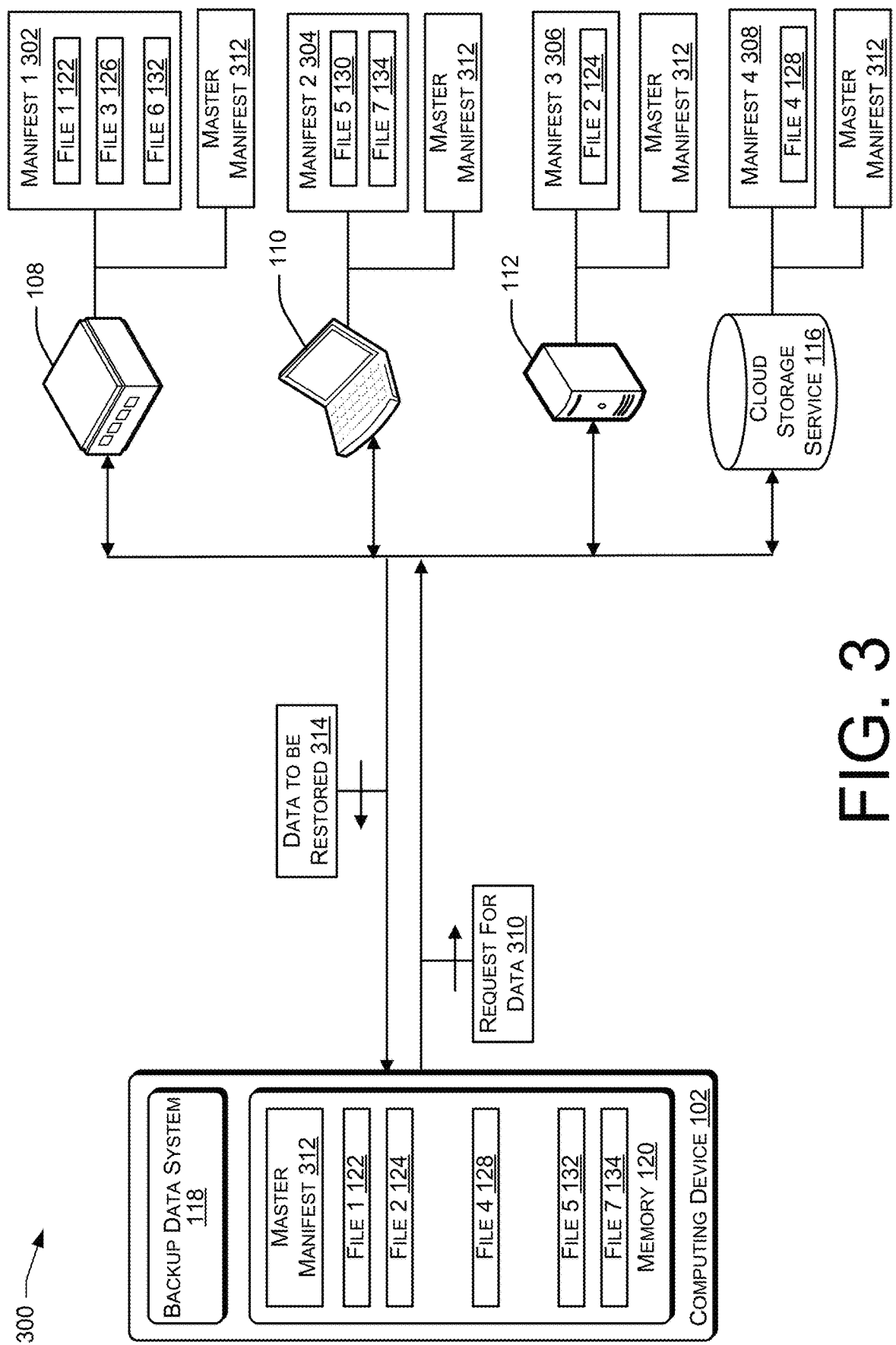
FIG. 3 is a diagram illustrating an example environment to recover data according to some embodiments.

FIG. 3 is a diagram illustrating an example environment 300 to recover data according to some embodiments. The environment 300 may include the computing device 102 having the backup data system 118 and the memory 120 storing data files. Additionally, the environment 300 may include the laptop computing device 110, the desktop computing device 112, the NAS device 114, and the cloud storage service 116. Also in the illustrative example of FIG. 3, the NAS device 114 may store backup copies of the first data file 122, the third data file 128, and the sixth data file 132; the laptop computing device 110 may store backup copies of the fifth data file 130 and the seventh data file 134; the desktop computing device 112 may store a backup copy of the second data file 124; and the cloud storage service 116 may store a backup copy of the fourth data file 128.

The computing devices 110, 112, 114, 116 may produce respective manifests that indicate the data files of the computing device 102 being backed up. For example, the NAS device 114 may produce a manifest 302 indicating that the NAS device 114 stores backup copies of the first data file 122, the third data file 126, and the sixth data file 132. Also, the laptop computing device 110 may produce a manifest 304 indicating that the laptop computing device 110 stores backup copies of the fifth data file 130 and the seventh data file 134. In addition, the desktop computing device 112 may produce a manifest 306 indicating that the desktop computing device 112 stores a backup copy of the second data file 124. Further, the cloud storage service 116 may produce a manifest 308 indicating that the cloud storage service 116 stores a backup copy of the fourth data file 128. The manifests 302, 304, 306, 308 may be computer-readable data files that may be used to determine the data files of the computing device 102 that are backed up on a particular backup storage device 110, 112, 114, 116. The manifests 302, 304, 306, 308, in some scenarios, may be text documents indicating the data files of the computing device 102 that are backed up on a particular backup storage device 110, 112, 114, 116.

In some implementations, the backup data system 118 may access the manifests of computing devices storing backup copies of the data files stored by the memory 120 to restore data files that may no longer be accessible to the computing device 102. In some cases, one or more of the data files stored by the memory 120 may be corrupted and may no longer be readable by the computing device 102. In other situations, one or more of the data files stored by the memory 120 may have been deleted from the memory 120 and may no longer be accessible to the computing device 102. In the illustrative example of FIG. 3, the third data file 126 and the fifth data tile 130 may no longer be accessible to the computing device 102.

The computing device 102 may send a request for data 310 to one or more of the computing devices 110, 112, 114, 116 to obtain the data files that are no longer accessible to the computing device 102. In some cases, the computing device 102 may send the request for data 310 to each of the computing devices 110, 112, 114, 116. In other cases, the computing device 102 may send the request for data 310 to the particular computing devices storing the backup copies of the inaccessible data files. For example, the memory 120 may store a separate master manifest 312 that indicates each of the computing devices that are storing backup copies of the data files stored by the memory 120. In these situations, the backup data system 118 may access the master manifest 312 to determine that the third data file 126 is stored by the NAS device 114 and the fifth data file 130 is stored by the laptop computing device 110. In the illustrative example of FIG. 3, the backup data system 118 may send the request for data 310 to the NAS device 114 to obtain the third data file 126 and send the request for data 310 to the laptop computing device 110 to obtain the fifth data file 130.

In response to receiving the request for data 310, one or more of the computing devices 110, 112, 114, 116 may access a respective manifest 302, 304, 306, 308 to determine whether a backup copy of the requested data is stored by the computing device. In scenarios in which the computing device is storing a backup copy of the requested data file, the computing device may send data to be restored 314 to the computing device 102. The data to be restored 314 may include a copy of a data file requested by the computing device 102. For example, the NAS device 114 may receive the request for data 310 from the computing device 102. The NAS device 114 may access the first manifest 302 to determine whether the NAS device 114 is storing one or more of the data files indicated by the request for data 310. In the illustrative example of FIG. 3, the request for data 310 may include a request obtain the third data file 126, and the NAS device 114 may access the first manifest 302 to determine that the NAS device 114 is storing a backup copy of the third data file 126. The NAS device 114 may then send the data to be restored 314 to the computing device 102, where the data to be restored 314 includes a copy of the third data file 126. The computing device 102 may utilize the data to be restored 314 to save the third data file 126 to the memory 120. In another example, the laptop computing device 110 may receive the request for data 310 from the computing device 102 and the laptop computing device 110 may access the second manifest 304 to determine whether the laptop computing device 110 is storing one or more of the data files indicated by the request for data 310. In the illustrative example of FIG. 3, the request for data 310 may include a request obtain the fifth data file 130, and the laptop computing device 110 may access the second manifest 304 to determine that the laptop computing device 110 is storing a backup copy of the fifth data file 130. The laptop computing device 110 may then send the data to be restored 314 to the computing device 102, where the data to be restored 314 includes a copy of the fifth data file 130. The computing device 102 may utilize the data to be restored 314 to save the fifth data file 130 to the memory 120.

The computing devices 108, 110, 112 and the cloud storage service 116 may also store, or otherwise have direct access to the master manifest 312. In addition to storing the storage locations of the data files stored by the computing device 102, the master manifest 312 may also include the storage locations of data files stored by each respective computing device 108, 110, 112 and the cloud storage service 116. In this way, should the data files of one or more of the computing devices 108, 110, 112 or the cloud storage service 116 become inaccessible, one or more of the remaining computing devices 108, 110, 112 and/or the cloud storage service 116 may utilize the master manifest 312 to restore the data files of the inaccessible computing device(s).

Figure 4:
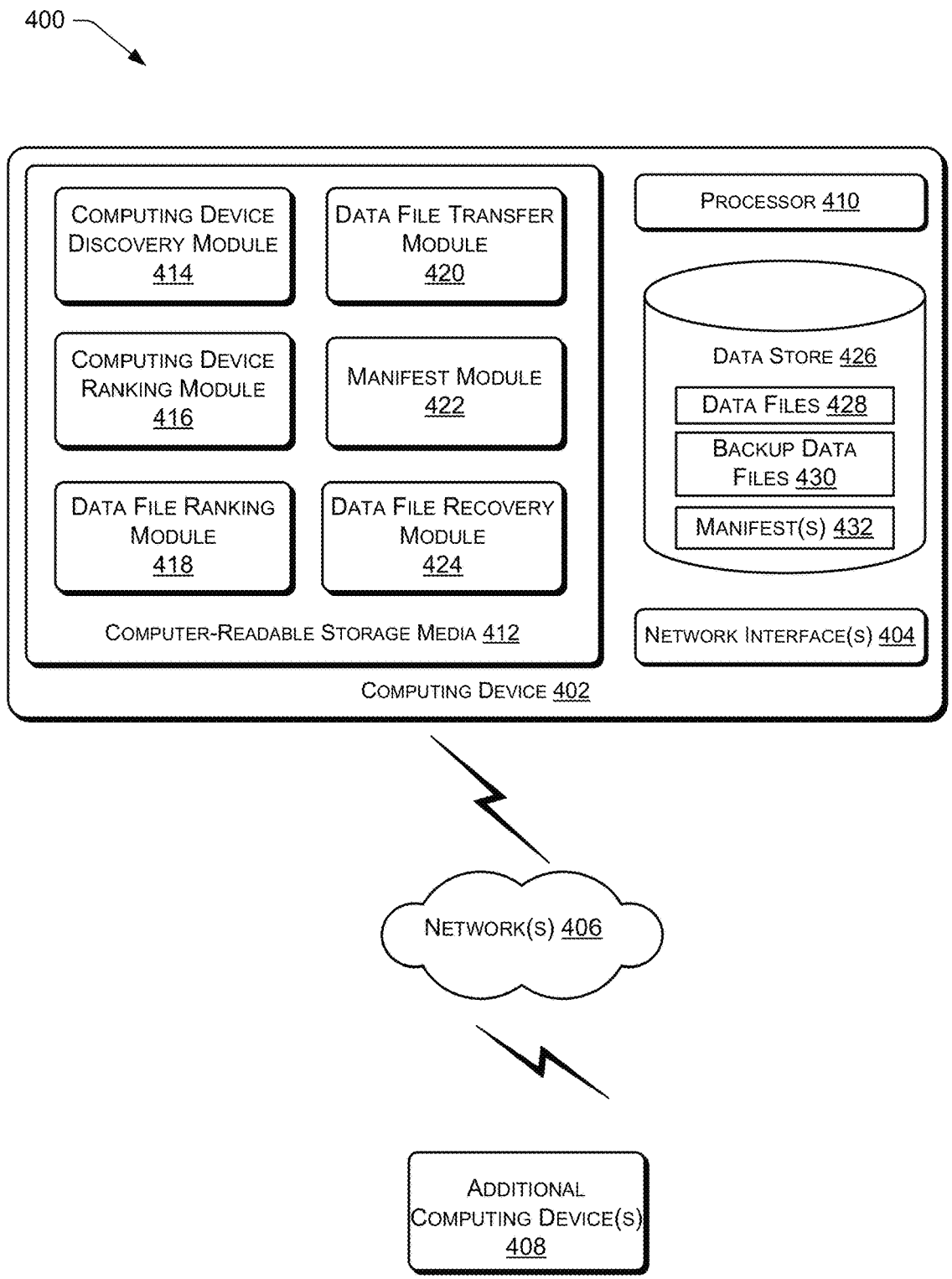
FIG. 4 is a block diagram illustrating an example system to backup and recover data according to some embodiments.

FIG. 4 is a block diagram illustrating an example system 400 to backup and restore data according to some embodiments. The system 400 includes a computing device 402 that may be used to backup data files and recover data files. The computing device 402 may include a laptop computing device, a tablet computing device, a mobile communications device (e.g., a mobile phone), a wearable computing device (e.g., watch, glasses, fitness tracking device, jewelry), a desktop computing device, a portable gaming device, combinations thereof, and the like. The computing device 402 may be operated by a user. The computing device 402 may include one or network interfaces 404 to communicate with other computing devices via one or more networks 406. The one or more networks 406 may include one or more of the Internet, a cable network, a satellite network, a wide area wireless communication network, a wired local area network, a wireless local area network, or a public switched telephone network (PSTN).

In particular embodiments, the computing device 402 may communicate over the one or more networks 406 with one or more additional computing devices 408. The one or more additional computing devices 408 may include computing devices that store backup copies of data files stored by the computing device 402. In addition, the one or more additional computing devices 408 may include candidate backup storage devices that may be evaluated by the computing device 402 to store backup copies of data files stored by the computing device 402. The one or more additional computing devices 408 may include a laptop computing device, a tablet computing device, a mobile communications device, a wearable computing device, a desktop computing device, a gaming console, an external storage device, a computing device of a cloud storage service, combinations thereof, and the like.

The computing device 402 may include one or more processors, such as processor 410. The one or more processors 410 may include at least one hardware processor, such as a microprocessor. In some cases, the one or more processors 410 may include a central processing unit (CPU), a graphics processing unit (GPU), or both a CPU and GPU, or other processing units. Additionally, the one or more processors 410 may include a local memory that may store program modules, program data, and/or one or more operating systems.

In addition, the computing device 402 may include one or more computer-readable storage media, such as computer-readable storage media 412. The computer-readable storage media 412 may include volatile and nonvolatile memory and/or removable and non-removable media implemented in any type of technology for storage of information, such as computer-readable instructions, data structures, program modules, or other data. Such computer-readable storage media 412 may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the computing device 402, the computer-readable storage media 412 may be a type of tangible computer-readable storage media and may be a non-transitory storage media.

The computer-readable storage media 412 may be used to store any number of functional components that are executable by the one or more processors 410. In many implementations, these functional components comprise instructions or programs that are executable by the one or more processors 410 and that, when executed, implement operational logic for performing the operations attributed to the computing device 402. Functional components of the computing device 402 that may be executed on the one or more processors 410 for implementing the various functions and features related to generating prioritized views of messages, as described herein, include a computing device discovery module 414, a computing device ranking module 416, a data file ranking module 418, a data file transfer module 420, a manifest module 422, and a data file recovery module 424 In some implementations, one or more of the modules 414, 416, 418, 420, 422, 424, may be included in the backup data system 118 of FIG. 1 and FIG. 3.

The computing device 402 may also include, or is coupled to, a data store 426 that may include, but is not limited to, RAM, ROM, EEPROM, flash memory, one or more hard disks, solid state drives, optical memory (e.g. CD, DVD), or other non-transient memory technologies. The data store 426 may maintain information that is utilized by the computing device 402 to perform operations related to the backup and recovery of data. For example, the data store 426 may store data files 428. The data store 426 may also store backup data files 428. In addition, the data store 428 may store one or more manifests 432. In some scenarios, the computer-readable storage media 406 and the data store 426 may be implemented using the same physical memory device(s). In other scenarios, at least a portion of the computer-readable storage media 406 and at least a portion of the data store 426 may be implemented using a different physical memory device(s).

In particular, the data files 428 may include data that is accessible by one or more applications executing on the computing device 402. The data files 428 may include output of one or more applications executing on the computing device 402. The data files 428 may be used as input to one or more applications executing on the computing device 402. In some cases, the data files 428 may be produced by a word processing application, a spreadsheet application, a messaging application, a portable document formatting application, a social networking application, a media content application (e.g., photo application, video application, audio application), an editing application, combinations thereof, and the like. The data files 428 may be accessed via file paths that indicate the storage locations of the data files 428. The backup data files 430 may include copies of data files produced by an application executing on another computing device, such as one or more of the additional computing devices 408.

The one or more manifests 432 may include data indicating the computing devices associated with the backup data files 430. For example, a manifest 432 associated with one of the additional computing device 408 may indicate data files of the additional computing device 408 that are backed up by the computing device 402. The one or more manifests 432 may also include a manifest 432 that indicates one or more of the additional computing devices 408 that are storing backup copies of the data files 428. In some implementations, the manifest 432 indicating computing devices storing backup copies of the data files 428 may be referred to herein as a "master manifest." In an illustrative example, the master manifest for the computing device 402 may indicate that backup copies at least a first portion of the data files 428 are stored by a first additional computing device 408 and that backup copies of at least a second portion of the data files 428 are stored by a second additional computing device 408. Furthermore, the one or more manifests 432 may include a system manifest that indicates the data files that are backed up on each backup storage device of a group of backup storage devices.

The computing device discovery module 414 may include computer-readable instructions that are executable by the processor 410 to identify computing devices that may be candidate backup storage devices for storing backup copies of the data files 428. The computing device discovery module 414 may identify computing devices 414 that are in communication with the computing device 402 via the one or more networks 406. In some cases, the computing device discovery module 414 may utilize the one or more network interfaces 404 to identify computing devices that are in communication with the computing device 402. For example, the computing device discovery module 414 may utilize the network interfaces 404 to identify one or more of the additional computing devices 408 that are transmitting communications over a local area wireless network using a particular communications standard. To illustrate, the computing device discovery module 414 may identify at least one additional computing device 408 that is communicating using a Bluetooth communications standard.

The computing device discovery module 414 may also communicate with an access point of one or more of the networks 404. In some implementations, the computing device discovery module 414 may communicate with an access point of a local area wireless network. The computing device discovery module 414 may communicate with the access point of the local area wireless network to identify other computing devices in communication with the access point. In various implementations, the computing device discovery module 414 may communicate with one or more of the additional computing devices 408 via the access point of the local area wireless network.

In particular implementations, the computing device discovery network 414 may identify computing devices to store backup copies of the data files 428. In some cases, the computing devices that store backup copies of the data files 428 may be associated with a particular network. For example, the computing devices that store backup copies of the data files 428 may communicate via a local area wireless network that corresponds to a particular wireless access point. The particular wireless access point may be located in a location that is associated with a user of the computing device 402. To illustrate, the particular wireless access point may be located in a residence of the user of the computing device 402. In another illustrative example, the particular wireless access point may be located in an enterprise associated with the user of the computing device 402. In additional illustrative examples, the particular wireless access point may be located in another location that is trusted by the user of the computing device 402. In further illustrative examples, the computing devices that store backup copies of the data files 428 may communicate via a particular wired local area network, such as an enterprise network or a wired home network, that is designated as a trusted environment associated with the computing device 402. Computing devices located in a trusted environment related to the computing device 402 may be candidate backup storage devices to store copies of the data files 428.

In various implementations, the computing device discovery module 414 may identify a wireless access point that is associated with a trusted environment of a user of the computing device 402 based at least partly on amount of time that the computing device 402 is connected to a local area wireless network. That is, the computing device discovery module 414 may determine an amount of time that the computing device 402 is coupled to one or more local area wireless networks. For example, the computing device discovery module 414 may determine an amount of time that the computing device 402 is connected to a local area wireless network that has a particular SSID. In an illustrative example, the computing device discovery module 414 may determine that the computing device 402 is located in a trusted environment of a user of the computing device 402 based at least partly on determining that the computing device 402 has been connected to a local area wireless network for a threshold period of time.

In some cases, the computing device discovery module 414 may also determine that the computing device 402 is located in a geographic location and determine that the geographic location is associated with a trusted environment of a user of the computing device 402. To illustrate, the computing device discovery module 414 may determine that the computing device 402 is located at geographic coordinates corresponding to an address associated with a residence of the user of the computing device 402. In another illustrative example, the computing device discovery module 414 may determine that the computing device 402 is located at geographic coordinates corresponding to an address associated with an enterprise of the user of the computing device 402.

Further, the computing device discovery module 414 may determine times of day that the computing device 402 is connected to one or more local area wireless networks to identify a local area wireless network that is located in a trusted environment of a user of the computing device 402. In some implementations, the computing device discovery module 414 may determine that the computing device 402 is located in a trusted environment based at least partly on the computing device 402 being connected to a local area wireless network during non-work hours of the user of the computing device 402, such as during the evening hours or nighttime hours. The computing device discovery module 414 may also identify a trusted environment of a user of the computing device 402 based at least partly on other computing devices connected to a local area wireless network. For example, the computing device discovery module 414 may determine that one or more other computing devices associated with the user of the computing device 402 (e.g., a mobile phone of the user, a desktop computing device of the user, etc.) are also connected to a particular local area wireless network and determine that the computing device 402 is located in a trusted environment based at least partly on the one or more other computing devices of the user being coupled to the same local area wireless network as the computing device 402.

The computing device discovery module 414 may also obtain information from the computing devices located in a trusted environment of the computing device 402. For example, the computing device discovery module 414 may obtain information regarding an additional computing device 408 connected to a particular local area wireless network indicating that the additional computing device 408 has been connected to the particular local area wireless network for a period of time. In another example, the computing device discovery module 414 may obtain information indicating a history of connection to the particular local area wireless network by an additional computing device 408. In some scenarios, the computing device discovery module 414 may obtain the information regarding the connection of an additional computing device 408 to a particular local area wireless network from the additional computing device 408. In other situations, the computing device discovery module 414 may obtain information regarding the connection of an additional computing device 408 to a particular local area wireless network from a wireless access point associated with the local area wireless network.

The computing device discovery module 414 may also obtain information about other features of computing devices located in a trusted environment of a user of the computing device 402. For example, the computing device discovery module 414 may obtain information related to memory features of computing devices located in a trusted environment of a user of the computing device 402. To illustrate, the computing device discovery module 414 may obtain information regarding one or more additional computing devices 408 indicating a technology of memory devices of the one or more additional computing devices 408, an age of memory devices of the one or more additional computing devices 408, or both. In some implementations, the computing device discovery module 414 may conduct a performance analysis to determine the write speed of memory devices of the one or more additional computing devices 408. In particular, the computing device discovery module 414 may obtain information regarding an additional computing device 408 indicating a Basic Input/Output System (BIOS) manufacturing date that may be used to determine an age of a memory device. The computing device discovery module 414 may also obtain information indicating that a memory device of an additional computing device is a spinning hard drive or a solid state drive.

The computing device discovery module 414 may also obtain information regarding a chassis of one or more additional computing devices 408 located in a trusted environment of a user of the computing device 402. Additionally, the computing device discovery module 414 may obtain information regarding network features included in a trusted environment of a user of the computing device 402. In some implementations, the computing device discovery module 414 may obtain information indicating communications technologies used by one or more of the additional computing devices 408. For example, the computing device discovery module 416 may obtain information indicating that an additional computing device 408 communicates using an IEEE 802.11 communications standard. In another example, the computing device discovery module 414 may obtain information indicating that an additional computing device 408 communicates using a Bluetooth communications standard. In an additional example, the computing device discovery module 414 may obtain information indicating that an additional computing device 408 communicates using a wide area wireless network communications standard (e.g., GSM, UMTS, CDMA, LTE, etc.). In a further example, the computing device discovery module 414 may obtain information indicating that an additional computing device 408 communicates using a wired local area network interface.

Additionally, the computing device discovery module 414 may obtain information about power features of computing devices included in a trusted environment related to the computing device 402. For example, the computing device discovery module 414 may obtain information indicating that one or more additional computing devices 408 may enter a low power mode after being inactive after a threshold period of time. In another example, the computing device discovery module 414 may obtain information indicating that one or more additional computing devices 408 may power off after being inactive after a threshold period of time. Further, the computing device discovery module 414 may obtain information indicating that one or more of the additional computing devices 408 may exit a lower power mode, power on, or both based at least partly on receiving one or more signals from another computing device, such as the computing device 402.

The computing device ranking module 416 may include computer-readable instructions that are executable by the processor 410 to rank computing devices included in a trusted environment associated with the computing device 402 according to a fitness of the computing devices to store backup copies of the data files 428. The fitness of computing devices to store backup copies of the data files 428 may be based at least partly on fitness scores determined by the computing device ranking module 416 from information obtained by the computing device discovery module 414. In particular implementations, one or more computing devices included in a trusted environment associated with the computing device 402 may be considered candidate backup storage devices and the computing device ranking module 416 may analyze features of the candidate backup storage devices to determine fitness scores for the candidate backup storage devices. The fitness scores of the candidate backup storage devices may be used to rank the candidate backup storing devices. In various implementations, the candidate backup storage devices may be ranked in decreasing order from the fitness score with the greatest value to the fitness score with the lowest value, where the candidate backup storage device having the fitness score with the greatest value is predicted by the computing device ranking module 416 to have the greatest fitness to store backup copies of the data files 428 and the candidate backup storage device having the fitness score with the lowest value is predicted to have the least fitness to store backup copies of the data files 428.

The computing device ranking module 416 may determine fitness scores for candidate backup storage devices by determining values for criteria used to determine the fitness scores. The criteria used to determine the fitness scores may correspond to properties of the candidate backup storage devices. Additionally, weights may be assigned to the criteria used to determine the fitness scores, where the weights reflect the relative importance of the criteria. In some cases, the criteria and/or the corresponding weights of the criteria used to determine fitness scores for the candidate backup storage devices may be specified by one or more users of the computing device 402, a distributor of a backup data system that may backup and restore data files, a producer of a backup data system that may backup and restore data files, an enterprise related to the computing device 402, or combinations thereof. In illustrative implementations, the criteria used to determine the fitness scores may correspond to memory features of the candidate backup storage devices, chassis of the candidate backup storage devices, network features of the candidate backup storage devices, power features of the candidate backup storage devices, location features of the candidate backup storage devices, or combinations thereof.

The data file ranking module 418 may include computer-readable instructions that are executable by the processor 410 to rank at least a portion of the data files 428. The data file ranking module 418 may determine priority scores for at least a portion of the data files 428 and rank at least a portion of the data files 428 based at least partly on the priority scores. In some implementations, the data file ranking module 418 may rank at least a portion of the data files 428 in decreasing order from the priority score having the greatest value to the priority score having the lowest value, where the data file 428 having the priority score with the greatest value is predicted by the computing device ranking module 416 to have the highest priority for being backed up and data file 428 having the priority score with the lowest value is predicted to have the lowest priority for being backed up.

In particular implementations, the data file ranking module 418 may determine priority scores for at least a portion of the data files 428 based at least partly on one or more criteria. The one or more criteria may correspond with properties of the data files 428. For example, one or more criteria used by the data file ranking module 418 may include a file type, a file size, usage history, file source, storage location, user preferences, or combinations thereof. In some implementations, one or more of the criteria used to determine the priority scores may be associated with a weighting that indicates a relative importance of the criteria with respect to prioritizing at least a portion of the data files 428 for backup. In some cases, the criteria and/or the corresponding weights of the criteria used to determine the priority scores for at least a portion of the data files 428 may be specified by one or more users of the computing device 402, a distributor of a backup data system that may backup and restore data files, a producer of a backup data system that may backup and restore data files, an enterprise related to the computing device 402, or combinations thereof.

The data file transfer module 420 may include computer-readable instructions that are executable by the processor 410 to send backup copies of at least a portion of the data files 428 to additional computing devices for backup storage. In some cases, the data file transfer module 420 may produce copies of one or more of the data files 428 that are to be backed up. The data file transfer module 420 may also send the copies of the data files 428 to be backed up to one or more of the additional computing devices 408 that are included in a trusted environment associated with the computing device 402.

In some implementations, the data file transfer module 420 may determine that backup copies of certain data files 428 are to be backed up by particular backup storage devices. For example, the data file transfer module 420 may utilize the rankings of at least a portion of the data files 428 and rankings of one or more of the additional computing devices 408 that are backup storage devices to pair data files 428 with candidate backup storage devices. To illustrate, the data file transfer module 420 may identify a candidate backup storage device having a particular ranking and associate one or more of the data files 428 to be backed up with the candidate backup storage device based at least partly on the rankings of the one or more data files 428. In an illustrative example, the data file transfer module 420 may associate a highest ranked candidate backup storage device with a first group of the data files 428 having relatively higher rankings. In another illustrative example, the data file transfer module 420 may associate a second highest ranked candidate backup storage device with a second group of the data files 428 having rankings that are below those of the first group. In this way, the data files 428 having the highest priorities are backed up on the candidate backup storage devices having the most fitness to store backup copies of the data files 428 and the data files 428 having lower priorities are backed up on backed up on the candidate backup storage devices having the least fitness to store backup copies of the data files 428. After determining the backup storage devices that are associated with one or more of the data files 428, the data file transfer module 420 may make copies of the one or more data files 428 and send the copies to the corresponding backup storage device.

The manifest module 422 may include computer-readable instructions that are executable by the processor 410 to produce the manifests 432. The manifest module 422 may produce a manifest 432 that indicates the backup storage devices that are storing backup copies of the data files 428. For example, the manifest module 422 may determine that a first backup storage device is storing a first group of the data files 428 and that a second backup storage device is storing a second group of the data files 428. Continuing with this example, the manifest module 422 may produce a manifest 432 that indicates that the first backup storage device is storing the first group of the data files 428 and that the second backup storage device is storing the second group of the data files 428. In some implementations, the manifest 432 that indicates the backup storage devices that stores backup copies of at least a portion of the data files 428 may be referred to as a "master manifest" for the computing device 402.

The manifest module 422 may also determine that the computing device 402 is storing backup copies of data files of one or more of the additional computing devices 408. In these situations, the manifest module 422 may produce a manifest 432 for each of the additional computing devices 408 for which the computing device 402 is storing backup copies of data files. For example, the manifest module 422 may produce a first manifest 432 indicating data files of a first additional computing device 408 that are being backed up by the computing device 402 and a second manifest 432 indicating data files of a second additional computing device 408 that are being backed up by the computing device 402.

Additionally, the manifest module 422 may update the manifests 432. In particular implementations, the manifest module 422 may determine that additional data files of one or more of the additional computing devices 408 are being backed up by the computing device 402. The manifest module 422 may update the manifest 432 of each additional computing device 408 as new data files are being backed up by the computing device 402 for one or more of the additional computing devices 408 by adding the new data files to the manifests 432. The manifest module 422 may also update manifests 432 of additional computing devices 408 as data files of the additional computing devices 408 are no longer being backed up by the computing device 402 by removing data files from the manifests 432. Furthermore, the manifest module 422 may update a manifest 432 associated with the computing device 402. For example, the manifest module 422 may determine that a data file 428 is being backup on by a different backup storage device and the manifest module 422 may update the master manifest of the computing device 402 to indicate that the data file 428 is being backed up on a different backup storage device. In another example, the manifest module 422 may determine that a newly created data file 428 is to be backed up on a particular backup storage device and the manifest module 424 may update the master manifest of the computing device 402 to indicate that the newly created data file 428 is being backed up on the particular backup storage device.

The data file recovery module 424 may include computer-readable instructions that are executable by the processor 410 to recover one or more of the data files 428 that may be inaccessible. In some implementations, the data file recovery module 424 may determine that a data file 428 is no longer accessible to an application of the computing device 402. In some cases, the data associated with the data file 428 may have been deleted from the computing device 402. In other cases, the data associated with the data file 428 may have been corrupted and no longer useable by an application of the computing device 402. The data file recovery module 424 may determine a backup data device that is storing a backup copy of the data file 428 that is inaccessible to the computing device 402. In particular, the data file recovery module 424 may utilize a manifest 432 of the computing device 402 that indicates the backup data storage device storing a backup copy of the data file 428 that is inaccessible by the computing device 402. The data file recovery module 424 may request, from the backup storage device, a copy of the data file 428 that is no longer accessible to the computing device 402. The data file recovery module 424 may then store the copy of the data file 428 received from the backup storage device.

The data file recovery module 424 may also receive requests from an additional computing device 408 to provide backup copies of data files of the additional computing device 408 that are no longer accessible by the additional computing device 408. In some implementations, the data file recovery module 424 may receive a request from an additional computing device 408 for backup copies of data files associated with the additional computing device 408. The data file recovery module 424 may access a manifest 432 that is related to the additional computing device 408 and determine one or more of the backup data files 430 that are associated with the additional computing device 408 that provided the request. The data file recovery module 424 may produce copies of the backup data files 430 associated with the additional computing device 408 making the request and send the copies of the particular backup data files 430 to the additional computing device 408.

In some cases, the additional computing device 408 providing the request for backup copies to the computing device 402 may have originally sent the backup data files 430 to the computing device 402. In these situations, the data files requested by the additional computing device 408 may have been deleted from memory of the additional computing device 408, corrupted, such as by a virus, or both. In other scenarios, the additional computing device 408 providing the request for backup copies to the computing device 402 may be a different computing device from the computing device that originally sent the backup data files 430 to the computing device 402. To illustrate, the memory of the computing device that originally providing the backup data files 430 to the computing device 402 may have been damaged to the extent that data files of the computing device became inaccessible to the computing device. In another illustration, the computing device that originally provided the backup data files 430 to the computing device 402 may have been lost or stolen. Thus, the additional computing device 408 requesting the backup data files 430 from the computing device 402 may be restoring data files of one or more portions of the memory of a computing device that is no longer accessible to a previous user of the computing device.

In situations where the additional computing device 408 is a replacement computing device, the data file recovery module 424 may receive a request from the replacement computing device to obtain one or more data files being backed up by the computing device 402 and a storage location for the one or more data files on the replacement computing device. For example, the data file recovery module 424 may receive a request to recover one or more backup data files 430 and an indication to store the one or more backup data files 430 in a My Documents folder of the replacement computing device. In other implementations, the data file recovery module 424 may receive a request from the replacement computing device to restore data files being backed up to one or more different computing devices. To illustrate, the data file recovery module 424 may receive a request to recover one or more backup data files 430 from a first additional computing device 408 that indicates the one or more backup data files 430 are to be restored to one or more second additional computing devices 408 and not the first additional computing device 408 sending the request. In these scenarios, the data file recovery module 424 may send the one or more backup data files 430 being restored to the one or more second additional computing devices 408 for storage.

Figure 5:
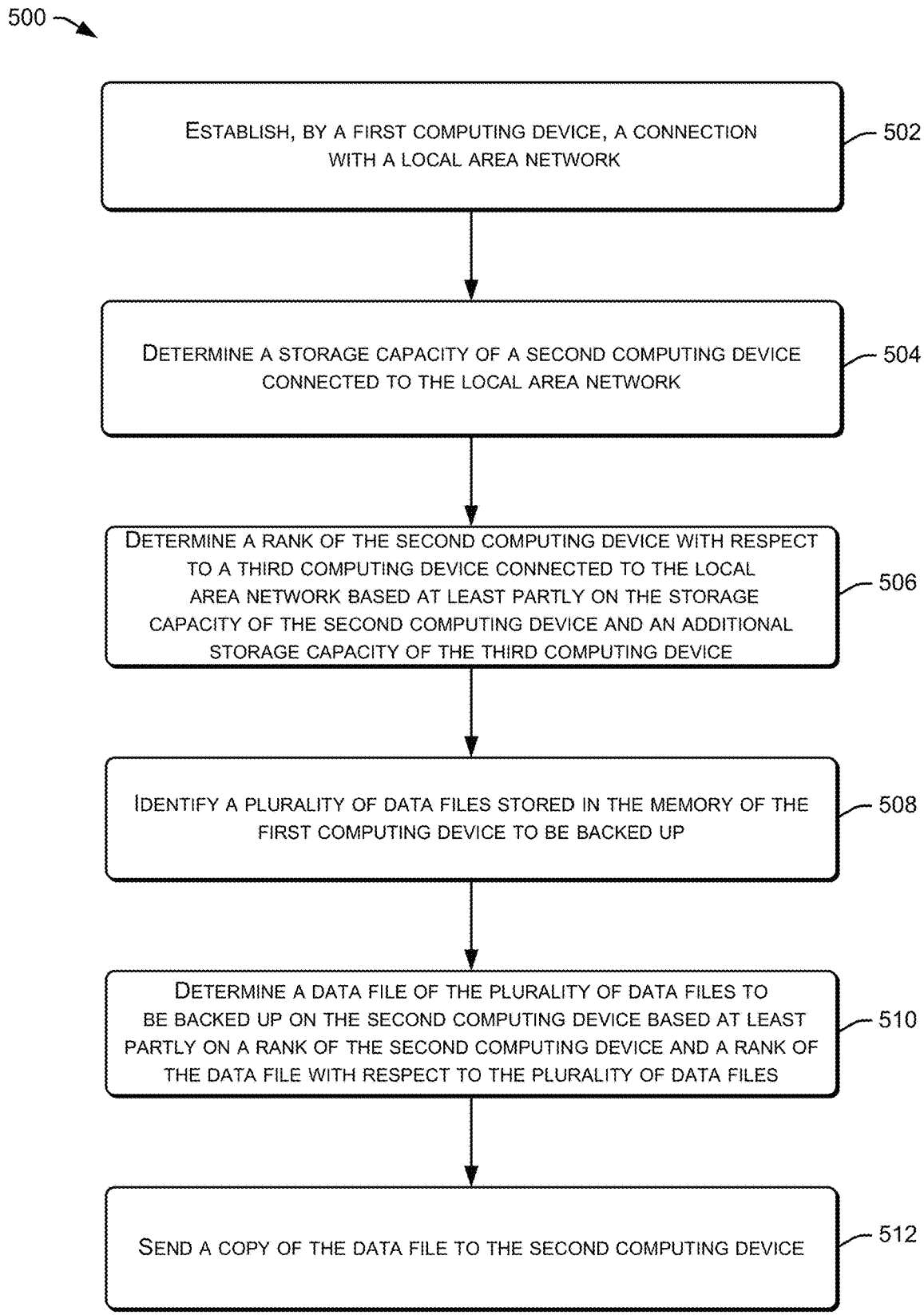
FIG. 5 is a flowchart of an example process to backup data according to some embodiments.
Figure 6:
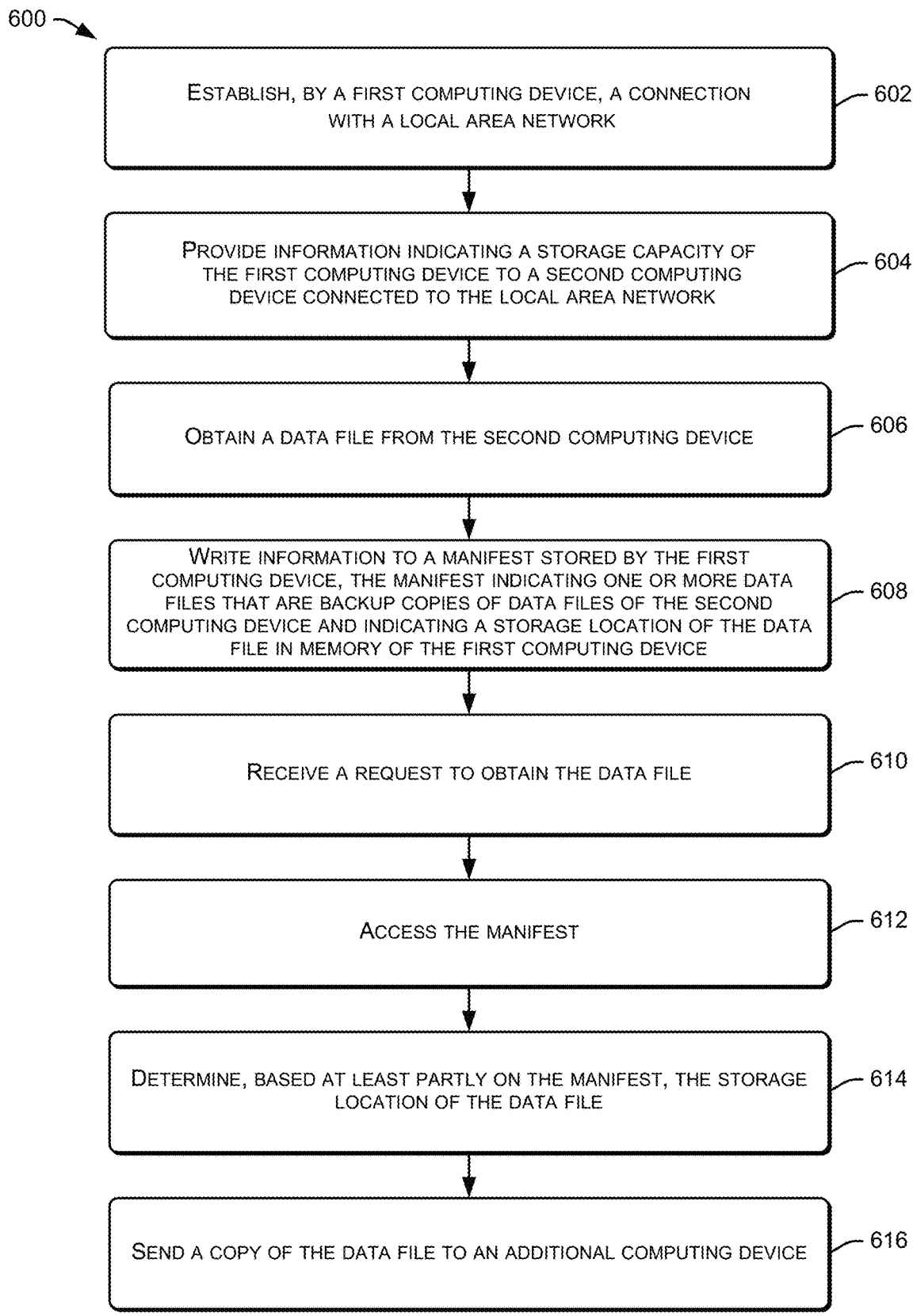
FIG. 6 is a flowchart of an example process to backup and recover data according to some embodiments.

In the flow diagrams of FIGS. 5 and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 500 and 600 may be described with reference to FIG. 1, 2, 3, or 4 as described above, although other models, frameworks, systems and environments may implement these processes.

FIG. 5 is a flowchart of an example process to backup data according to some embodiments. At 502, the process 500 includes establishing, by a first computing device, a connection with a local area network. In some cases, the local area network may include a wireless local area network. The wireless local area network may be accessed by a wireless access point. In some implementations, the first computing device may identify a number of computing devices connected to the local area network by obtaining, from the wireless access point, identifiers of computing devices connected to the local area network. Based at least partly on the information obtained from the wireless access point, the first computing device may determine that the second computing device and the third computing device are connected to the local area network. For example, the first computing device may determine that the second computing device and the third computing device are connected to a local area wireless network based at least partly on the identifiers obtained from the wireless access point.

In some implementations, the first computing device may establish the connection with the local area network via a first network interface of the first computing device that sends and receives communications according to a first wireless communications standard. The first computing device may also communicate with other computing devices via different types of networks using an additional network interface of the first computing device. For example, the first computing device may establish an additional connection with an additional computing device via a second network interface of the first computing device, where the second network interface may send and receive communications according to a second wireless communications standard.

At 504, the process 500 includes determining, by the first computing device, a storage capacity of a second computing device connected to the local area network. At 506, the process 500 includes determining, by the first computing device, a rank of the second computing device with respect to a third computing device based at least partly on the storage capacity of the second computing device and an additional storage capacity of the third computing device. The ranking may be also based at least partly on one or more additional features of the second computing device and each of the one or more features may be associated with a respective weight and a respective value. In some cases, the one or more additional features of the second computing device may include a chassis of the second computing device, a network interface of the second computing device, a location of the second computing device, features of a memory of the computing device, the second computing device entering a low power mode after a period of time, or combinations thereof.

The ranking of the second computing device may also be determined based on information obtained from a wireless access point associated with the local area network. For example, the first computing device may obtain information from the wireless access point indicating an average amount of time that the second computing device is connected to the local area network during a specified period of time, such as an average amount of time per day that the second computing device is connected to the local area network. In these situations, the first computing device may determine that the data file of the plurality of data files is to be backed up on the second computing device based at least partly on the average amount of time that the second computing device is connected to the local area network during the specified period of time.

In particular implementations, the first computing device may also be ranked by other computing devices based on information about the first computing device provided to the other computing devices. For example, the first computing device may send additional information to the second computing device and the additional information may indicate a chassis of the first computing device, a communications standard utilized by a network interface of the first computing device, a location of the first computing device, that the first computing device enters a low power mode after a period of inactivity, or combinations thereof.

At 508, the process 500 includes identifying, by the first computing device, a plurality of data files to be backed up, where the plurality of data files are stored by the memory of the first computing device. At 510, the process 500 includes determining, by the first computing device, a data file of the plurality of data files to be backed up on the second computing device based at least partly on a rank of the second computing device. In various implementations, the data file may also be ranked with respect to the plurality of data files to determine that the data file is to be backed up by the second computing device. The rank of the data file may indicate a priority for backing up the data file. The priority of the data file may be based at least partly on an amount of the memory consumed by the data file, a usage history of the data file, a type of content of the data file, a source of the data file, a storage location of the data file, or combinations thereof.

At 512, the process 500 includes sending, by the first computing device, a copy of the data file to the second computing device. In some situations, the first computing device may subsequently determine that the data file has become inaccessible by one or more processors of the first computing device. In addition, the first computing device may determine that a copy of the data file is stored by the second computing device. The first computing device may determine that the copy of the data file is stored by the second computing device based at least partly on a manifest stored by the first computing device that indicates storage locations of backup copies of data files of the first computing device. The first computing device may send a request to the second computing device to obtain the data file and receive the data file from the second computing device based at least partly on the request.

FIG. 6 is a flowchart of an example process backup and recover data according to some embodiments. At 602, the process 600 includes establishing, by a first computing device, a connection with a local area network. At 604, the process 600 includes providing information indicating a storage capacity of the first computing device to a second computing device connected to the local area network. The second computing device may utilize at least the storage capacity of the first computing device to identify data files to be backed up on the first computing device. At 606, the process 600 includes obtaining a data file from the second computing device. In particular implementations, a compression algorithm may be applied with respect to the data file before storing the data file in the memory of the first computing device.

At 608, the process 600 includes writing information to a manifest stored by the first computing device. The manifest may indicate one or more data files that are backup copies of data files of the second computing device. The manifest may also indicate a storage location of the data file in memory of the first computing device. Other manifests produced by the first computing device may indicate additional data files of additional computing devices that are being backed up by the first computing devices and storage locations of the backup copies of the additional data files. Additionally, the manifest may be updated to indicate new data files that are received by the first computing device from additional computing devices and that are to be backed up by the first computing device.

At 610, the process 600 includes receiving a request to obtain the data file of the second computing device that is backed up on the first computing device. At 612, the process 600 includes accessing the manifest based at least partly on the request to obtain the data file of the second computing device. At 614, the process 600 includes determining, based at least partly on the manifest, that the data file is stored in the memory of the first computing device. At 616, the process 600 includes sending a copy of the data file to an additional computing device. In some cases, the first computing device may produce a copy of the data file before providing the data file to the additional computing device. The additional computing device may be the second computing device in some situations. In other scenarios, the additional computing device may be different from the second computing device.

Figure 7:
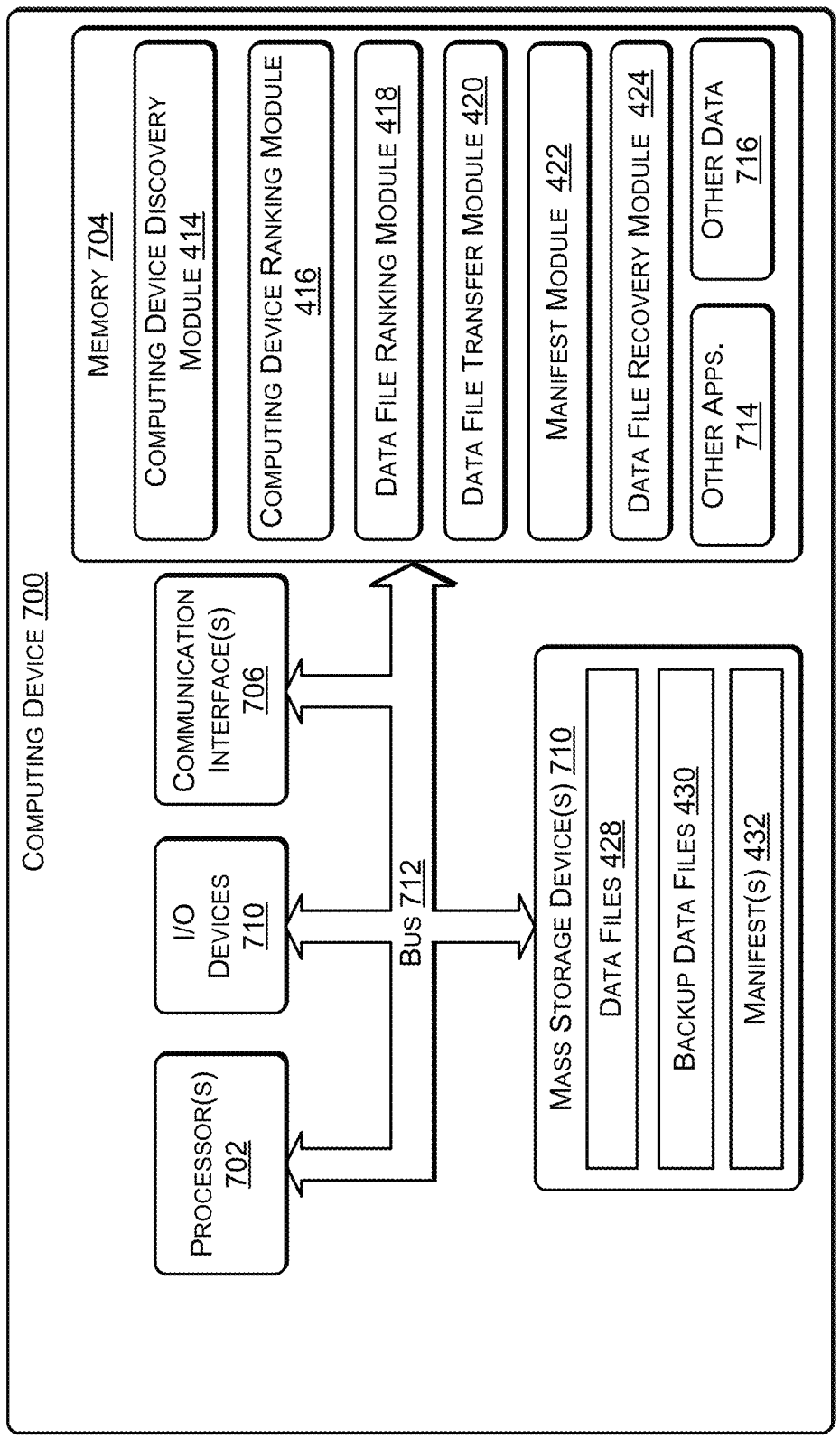
FIG. 7 illustrates an example configuration of a computing device that can be used to implement the systems and techniques described herein according to some embodiments.

FIG. 7 illustrates an example configuration of a computing device 700 that can be used to implement the systems and techniques described herein according to some embodiments. In some cases, the computing device 700 may include the computing device 102 or the computing device 402. Additionally, the additional computing devices 108, 110, 112, 114, 408 may be represented by the computing device 700. The computing device 700 may include one or more processors 702, a memory 704, communication interfaces 706, input/output (I/O) devices 708, and one or more mass storage devices 710, configured to communicate with each other, such as via a system bus 712 or other suitable connection.

The processors 702 may include a single processing unit or a number of processing units, all of which may include single or multiple computing units or multiple cores. The processors 702 can be implemented as one or more microprocessors, microcomputers, microcontrollers, digital signal processors, central processing units, state machines, logic circuitries, and/or any devices that manipulate signals based on operational instructions. Among other capabilities, the processors 702 can be configured to fetch and execute computer-readable instructions stored in the memory 704, mass storage devices 710, or other computer-readable media.

Memory 704 and mass storage devices 710 are examples of computer storage media for storing instructions which are executed by the processors 702 to perform the various functions described above. For example, memory 704 may generally include both volatile memory and non-volatile memory (e.g., RAM, ROM, or the like). Further, mass storage devices 710 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 710 may be collectively referred to as memory or computer storage media herein, and may be a non-transitory media capable of storing computer-readable, processor-executable program instructions as computer program code that can be executed by the processor 702 as a particular machine configured for carrying out the operations and functions described in the implementations herein. The memory of the computing device 700 may be used to store the data files 428, the backup data files 430, and the manifest(s) 432.

The computer storage media, such as memory 704 and mass storage devices 710, may be used to store software applications and data. For example, the computer storage media may include software applications, such as, for example, the computing device discovery module 414, the computing device ranking module 416, the data file ranking module 418, the data file transfer module 420, the manifest module 422, and the data file recovery module 424.

The computing device 700 may also include one or more communication interfaces 706 for exchanging data via a network. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 706 can also provide communication with external storage (not shown), such as in a storage array, network attached storage, storage area network, or the like.

I/O devices 710 may be devices that receive various inputs from a user and provide various outputs to the user, and may include a display device, keyboard, a remote controller, a mouse, a printer, audio input/output devices, and so forth.

The example systems and computing devices described herein are merely examples suitable for some implementations and are not intended to suggest any limitation as to the scope of use or functionality of the environments, architectures and frameworks that can implement the processes, components and features described herein. Thus, embodiments herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry), or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example embodiments, as described and as illustrated in the drawings. However, this disclosure is not limited to the embodiments described and illustrated herein, but can extend to other embodiments, as would be known or as would become known to those skilled in the art. Reference in the specification to "one embodiment," "this embodiment," "these embodiments" or "some embodiments" means that a particular feature, structure, or characteristic described is included in at least one implementation, and the appearances of these phrases in various places in the specification are not necessarily all referring to the same embodiment.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. One or more non-transitory computer-readable media, comprising instructions that are executable by one or more processors to perform operations comprising:
    establishing, by a first computing device, a connection with a local area network, the local area network comprising a plurality of devices and a second computing device;
    providing a plurality of device criteria associated with the first computing device to the plurality of devices and the second computing device that are connected to the local area network, the plurality of device criteria comprising:
        a network interface of the first computing device,
        a location of the first computing device,
        an average amount of time that the first computing device is connected to the local area network during a specified period of time,
        an amount of time before the first computing device enters a low power mode, and
        a storage capacity of the first computing device;
    receiving, by the first computing device, a data file torn the second computing device based on the second computing device determining that the first computing device has a highest rank compared to ranks of the plurality of computing devices, wherein the highest rank and the ranks are determined based on the plurality of device criteria, respectively, associated with the first computing device and the plurality of computing devices, respectively;
    storing the data file at a particular location on the first computing device; and
    writing information to a manifest, wherein the information identifies the particular location of the data file.

2. The one or more non-transitory computer-readable media of claim 1, wherein the operations further comprise:
    receiving, from an additional computing device, a request to obtain the data file;
    accessing, based at least partly on the request, the manifest;
    determining, based at least partly on the manifest, the particular location of the data file; and
    sending a copy of the data file to the additional computing device.

3. The one or more non-transitory computer-readable media of claim 1, wherein storing the data file at the particular location on the first computing device comprises:
    applying a compression algorithm to the data file to create a compressed data file; and
    storing the compressed data file at the particular location on the first computing device.

4. The one or more non-transitory computer-readable media of claim 1, wherein the plurality of device criteria associated with the first computing device further comprise:
    a chassis type of the first computing device; and
    one or more features of the memory of the first computing device.

5. The one or more non-transitory computer-readable media of claim 4, wherein the chassis type comprises one of a server chassis, a storage chassis, a portable chassis, or a handheld chassis.

6. The one or more non-transitory computer-readable media of claim 1, wherein establishing the connection with the local area network includes accessing a wireless access point of the local area network.

7. The one or more non-transitory computer-readable media of claim 1, wherein the second computing device determines a corresponding priority of the data file based on one of a plurality of file criteria, the plurality of file criteria comprising:
    a file type of the data file;
    a file source of the data file;
    an amount of memory consumed by the data file;
    a usage history of the data file; and
    a storage location of the data file.

8. A method comprising:
    establishing, by a first computing device, a connection with a local area network, the local area network comprising a plurality of devices and a second computing device;
    providing, by the first computing device, a plurality of device criteria associated with the first computing device to the plurality of devices and the second computing device that are connected to the local area network, the plurality of device criteria comprising:
        a network interface of the first computing device,
        a location of the first computing device,
        an average amount of time that the first computing device is connected to the local area network during a specified period of time,
        an amount of time before the first computing device enters a low power mode, and
        a storage capacity of the first computing device;
    receiving, by the first computing device, a data file from the second computing device based on the second computing device determining that the first computing device has a highest rank compared to ranks of the plurality of computing devices, wherein the highest rank and the ranks are determined based on the plurality of device criteria, respectively, associated with the first computing device and the plurality of computing devices, respectively;
    storing, by the first computing device, the data file at a particular location on the first computing device; and
    adding, by the first computing device, information to a manifest, wherein the manifest identifies the particular location of the data file.

9. The method of claim 8, further comprising:
    receiving, from an additional computing device, a request to obtain the data file;
    accessing, based at least partly on the request, the manifest;
    determining, based at least partly on the manifest, the particular location of the data file; and
    sending a copy of the data file to the additional computing device.

10. The method of claim 8, wherein storing the data file at the particular location on the first computing device comprises:
    applying a compression algorithm to the data file to create a compressed data file; and
    storing the compressed data file at the particular location on the first computing device.

11. The method of claim 8, further comprising:
    receiving, from an additional computing device, a request to store an additional data file;
    storing the additional data file at a second particular location on the first computing device; and
    adding additional information to the manifest, wherein the additional information identifies the second particular location of the additional data file.

12. The method of claim 11, further comprising:
receiving, from the additional computing device, a request to provide the additional data file;
accessing the additional information in the manifest, the additional information identifying the second particular location of the additional data file;
retrieving the additional data file from the second particular location on the first computing device; and
sending the additional data file from the first computing device to the additional computing device.

13. The method of claim 8, wherein the plurality of device criteria associated with the first computing device further comprise:
a chassis type of the first computing device, wherein the chassis type comprises one of a server chassis, a storage chassis, a portable chassis, or a handheld chassis; and
one or more features of the memory of the first computing device, wherein the one or more features of the memory comprise at least one of a spinning hard drive, a solid-state drive, or a flash memory device.

14. The method of claim 8, wherein:
the second computing device determines a corresponding priority of the data file on one of a plurality of file criteria, the plurality of file criteria comprising:
a file type of the data file;
a file source of the data file;
an amount of memory consumed by the data file;
a usage history of the data file; and
a storage location of the data file.

15. A first computing device comprising:
one or more processors, and
one or more non-transitory computer-readable media, comprising instructions that are executable by one or more processors to perform operations comprising:
establishing a connection with a local area network, the local area network comprising a plurality of devices and a second computing device;
providing a plurality of device criteria associated with the first computing device to the plurality of devices and second computing device that are connected to the local area network, the plurality of device criteria comprising:
a network interface of the computing device,
a location of the computing device,
an average amount of time that the computing device is connected to the local area network during a specified period of time,
an amount of time before the computing device enters a low power mode, and
a storage capacity of the computing device;
receiving a data file from the second computing device based on the second computing device determining that the first computing device has a highest rank compared to ranks of the plurality of computing devices, wherein the highest rank and the ranks are determined based on the plurality of device criteria, respectively, associated with the first computing device and the plurality of computing devices, respectively;
storing the data file at a particular location on the first computing device; and
writing information to a manifest, wherein the information identifies the particular location of the data file.

16. The first computing device of claim 15, wherein the operations further comprise:
receiving, from an additional computing device, a request to obtain the data file;
accessing, based at least partly on the request, the manifest;
determining, based at least partly on the manifest, the particular location of the data file; and
sending a copy of the data file to the additional computing device.

17. The first computing device of claim 15, wherein storing the data file at the particular location on the computing device comprises:
applying a compression algorithm to the data file to create a compressed data file; and
storing the compressed data file at the particular location on the computing device.

18. The first computing device of claim 15, wherein the first device criteria further comprise:
a chassis type of the computing device, wherein the chassis type comprises one of a server chassis, a storage chassis, a portable chassis, or a handheld chassis; and
one or more features of the memory of the computing device, wherein the one or more features of the memory comprise at least one of a spinning hard drive, a solid-state drive, or a flash memory device.

19. The first computing device of claim 15, the operations further comprising:
determining, from a wireless access point associated with the local area network, a second identifier associated with the second computing device; and
determining that the second computing device is connected to the local area network based at least partly on the second identifier associated with the second computing device.

20. The first computing device of claim 15, wherein the operations further comprise:
receiving, from an additional computing device, a request to obtain the data file;
determining, based at least partly on the manifest, the particular location of the data file;
determining that the data file is unavailable or inaccessible;
determining, based at least partly on the manifest, that a copy of the data file is stored in a second particular location on a third computing device; and
sending an instruction to the third computing device to send the copy of the data file to the additional computing device.

* * * * *